(12) United States Patent
Welschoff

(10) Patent No.: US 10,569,638 B2
(45) Date of Patent: Feb. 25, 2020

(54) ALL ELECTRIC VEHICLE WITHOUT PLUG-IN REQUIREMENT

(71) Applicant: Heinz Welschoff, Fort Lauderdale, FL (US)

(72) Inventor: Heinz Welschoff, Fort Lauderdale, FL (US)

( * ) Notice: Subject to any disclaimer, the term of this patent is extended or adjusted under 35 U.S.C. 154(b) by 0 days.

(21) Appl. No.: 15/179,426

(22) Filed: Jun. 10, 2016

(65) Prior Publication Data

US 2017/0028837 A1 Feb. 2, 2017

Related U.S. Application Data

(63) Continuation-in-part of application No. 14/314,907, filed on Jun. 25, 2014, now abandoned.

(51) Int. Cl.
*B60K 6/26* (2007.10)
*B60K 6/28* (2007.10)
(Continued)

(52) U.S. Cl.
CPC ............... *B60K 6/52* (2013.01); *B60K 6/24* (2013.01); *B60K 6/26* (2013.01); *B60K 6/28* (2013.01); *B60K 6/365* (2013.01); *B60K 6/46* (2013.01); *B60L 50/61* (2019.02); *B60L 58/12* (2019.02); *B60L 2240/421* (2013.01); *B60L 2240/547* (2013.01); *B60L 2250/26* (2013.01); *B60Y 2200/92* (2013.01); *B60Y 2400/47* (2013.01); *B60Y 2400/602* (2013.01); *B60Y 2400/604* (2013.01); *B60Y 2400/82* (2013.01); *Y02T 10/6217* (2013.01); *Y02T 90/14* (2013.01); *Y10S 903/905* (2013.01); *Y10S 903/906* (2013.01); *Y10S 903/907* (2013.01); *Y10S 903/91* (2013.01); *Y10S 903/916* (2013.01); *Y10S 903/918* (2013.01)

(58) Field of Classification Search
CPC .... B60K 6/52; B60K 6/26; B60K 6/28; Y10S 903/906; Y10S 903/907; B60L 50/61; B60L 58/12
See application file for complete search history.

(56) References Cited

U.S. PATENT DOCUMENTS 3,878,913 A * 4/1975 Lionts ..................... B60K 1/00 180/2.2
3,917,017 A * 11/1975 Deane ................. B60L 11/126 180/65.245

(Continued)

*Primary Examiner* — Joseph M Rocca
*Assistant Examiner* — Maurice L Williams
(74) *Attorney, Agent, or Firm* — Melvin K. Silverman

(57) ABSTRACT

An electric powered vehicle having a battery pack capable of storing electric energy and a clean fuel engine operated with a clean fuel. A first D/C alternator communicating with the clean fuel engine, supplying electric energy to the electric driving motor. A timing gear belt driven starter/alternator that is connected directly to the clean fuel engine, activating the clean fuel engine when the battery pack reaches loss at a maximum of 30% capacity remaining. Thereafter, a second D/C alternator and yet thereafter a third D/C alternator communicating with the clean fuel engine during periods when no electrical communication exists between the electric driver motor and battery packs. The D/C alternators maintain an electrical output to the battery packs until recharged.

5 Claims, 15 Drawing Sheets

(51) Int. Cl.
  *B60K 6/52* (2007.10)
  *B60L 50/61* (2019.01)
  *B60L 58/12* (2019.01)
  *B60K 6/365* (2007.10)
  *B60K 6/24* (2007.10)
  *B60K 6/46* (2007.10)

(56) References Cited

U.S. PATENT DOCUMENTS

| | | | | |
|---|---|---|---|---|
| 4,042,056 A * | 8/1977 | Horwinski | | B60K 6/387 |
| | | | | 180/65.25 |
| 4,119,862 A | 10/1978 | Gocho | | |
| 4,254,843 A * | 3/1981 | Han | | B60K 1/00 |
| | | | | 180/165 |
| 4,496,016 A | 1/1985 | Unsworth | | |
| 4,689,531 A * | 8/1987 | Bacon | | B60L 11/126 |
| | | | | 318/139 |
| 4,923,025 A * | 5/1990 | Ellers | | B60K 6/44 |
| | | | | 180/65.23 |
| 5,150,034 A * | 9/1992 | Kyoukane | | B60K 6/46 |
| | | | | 180/65.245 |
| 5,215,156 A * | 6/1993 | Stulbach | | B60L 11/12 |
| | | | | 180/165 |
| 5,680,908 A * | 10/1997 | Reed | | B60K 1/00 |
| | | | | 180/165 |
| 5,921,334 A * | 7/1999 | Al-Dokhi | | B60L 8/00 |
| | | | | 180/2.2 |
| 6,886,647 B1 * | 5/2005 | Gotta | | B60K 1/02 |
| | | | | 180/65.1 |
| 7,183,746 B1 * | 2/2007 | Carter | | B60L 11/126 |
| | | | | 180/65.245 |
| 7,497,285 B1 * | 3/2009 | Radev | | B60K 6/26 |
| | | | | 180/65.225 |
| 2001/0039230 A1 * | 11/2001 | Severinsky | | B60H 1/004 |
| | | | | 477/3 |
| 2002/0108794 A1 * | 8/2002 | Wakashiro | | B60K 6/48 |
| | | | | 180/65.25 |
| 2006/0001399 A1 * | 1/2006 | Salasoo | | B60K 6/28 |
| | | | | 320/104 |
| 2007/0255477 A1 * | 11/2007 | Okuda | | B60K 6/442 |
| | | | | 701/93 |
| 2008/0180000 A1 * | 7/2008 | Ward | | B60K 6/48 |
| | | | | 310/68 R |
| 2009/0015202 A1 * | 1/2009 | Miura | | B60W 10/26 |
| | | | | 320/132 |
| 2009/0033101 A1 * | 2/2009 | Spielberger | | F01K 15/02 |
| | | | | 290/1 R |
| 2009/0231811 A1 * | 9/2009 | Tokuyama | | H01L 23/36 |
| | | | | 361/699 |
| 2010/0079115 A1 * | 4/2010 | Lubawy | | B60L 7/10 |
| | | | | 320/150 |
| 2011/0260659 A1 * | 10/2011 | Kamachi | | B60L 3/06 |
| | | | | 318/139 |
| 2012/0049771 A1 * | 3/2012 | Komatsu | | B60K 6/365 |
| | | | | 318/139 |
| 2012/0091731 A1 * | 4/2012 | Nelson | | H02J 7/0024 |
| | | | | 290/1 R |
| 2012/0174708 A1 * | 7/2012 | Nagamori | | B60K 1/04 |
| | | | | 74/665 L |
| 2012/0323421 A1 * | 12/2012 | Avery | | B60L 11/1853 |
| | | | | 701/22 |
| 2012/0323430 A1 * | 12/2012 | Nakamura | | B60L 11/1803 |
| | | | | 701/22 |
| 2013/0066497 A1 * | 3/2013 | Nissato | | B60K 6/448 |
| | | | | 701/22 |
| 2013/0111932 A1 * | 5/2013 | Mishima | | F25B 29/00 |
| | | | | 62/79 |
| 2013/0226387 A1 * | 8/2013 | Hayashi | | B60K 6/442 |
| | | | | 701/22 |
| 2013/0260955 A1 * | 10/2013 | Kimata | | B60K 6/52 |
| | | | | 477/3 |
| 2013/0281247 A1 * | 10/2013 | Holmes | | B60K 6/52 |
| | | | | 475/150 |
| 2013/0296116 A1 * | 11/2013 | Dai | | B60W 10/06 |
| | | | | 477/5 |
| 2014/0005864 A1 * | 1/2014 | Holmes | | B60K 6/38 |
| | | | | 701/22 |
| 2014/0045648 A1 * | 2/2014 | Bangura | | F02N 11/006 |
| | | | | 477/3 |
| 2014/0054100 A1 * | 2/2014 | Boskovitch | | B60K 6/46 |
| | | | | 180/242 |
| 2014/0121865 A1 * | 5/2014 | Anderson | | F02N 11/0822 |
| | | | | 701/22 |
| 2014/0228165 A1 * | 8/2014 | Frank | | B60K 6/442 |
| | | | | 477/5 |
| 2014/0311284 A1 * | 10/2014 | Chen | | B60K 6/547 |
| | | | | 74/661 |
| 2014/0335995 A1 * | 11/2014 | Swales | | B60W 20/00 |
| | | | | 477/3 |
| 2015/0032314 A1 * | 1/2015 | Kitamura | | E02F 9/123 |
| | | | | 701/22 |
| 2015/0051774 A1 * | 2/2015 | Roesch | | B60W 10/06 |
| | | | | 701/22 |
| 2015/0239365 A1 * | 8/2015 | Hyde | | B60L 11/1861 |
| | | | | 701/2 |
| 2015/0258886 A1 * | 9/2015 | Aimo Boot | | B60K 6/52 |
| | | | | 701/22 |
| 2015/0329103 A1 * | 11/2015 | Kim | | B60W 10/10 |
| | | | | 180/65.23 |
| 2016/0185207 A1 * | 6/2016 | Gerschutz | | B60K 6/52 |
| | | | | 180/243 |

\* cited by examiner

In Fig. 1C line added to show rotor 17

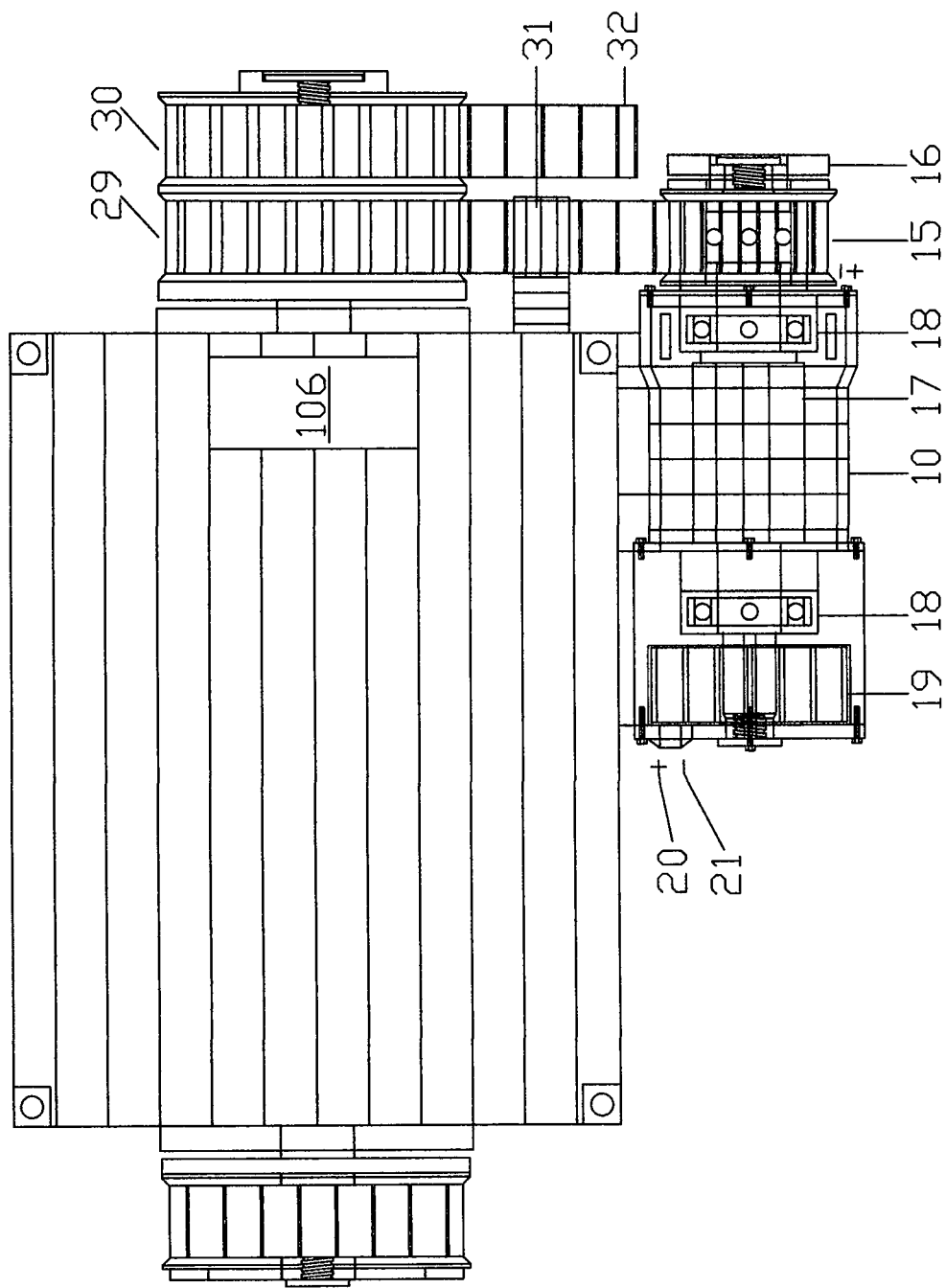

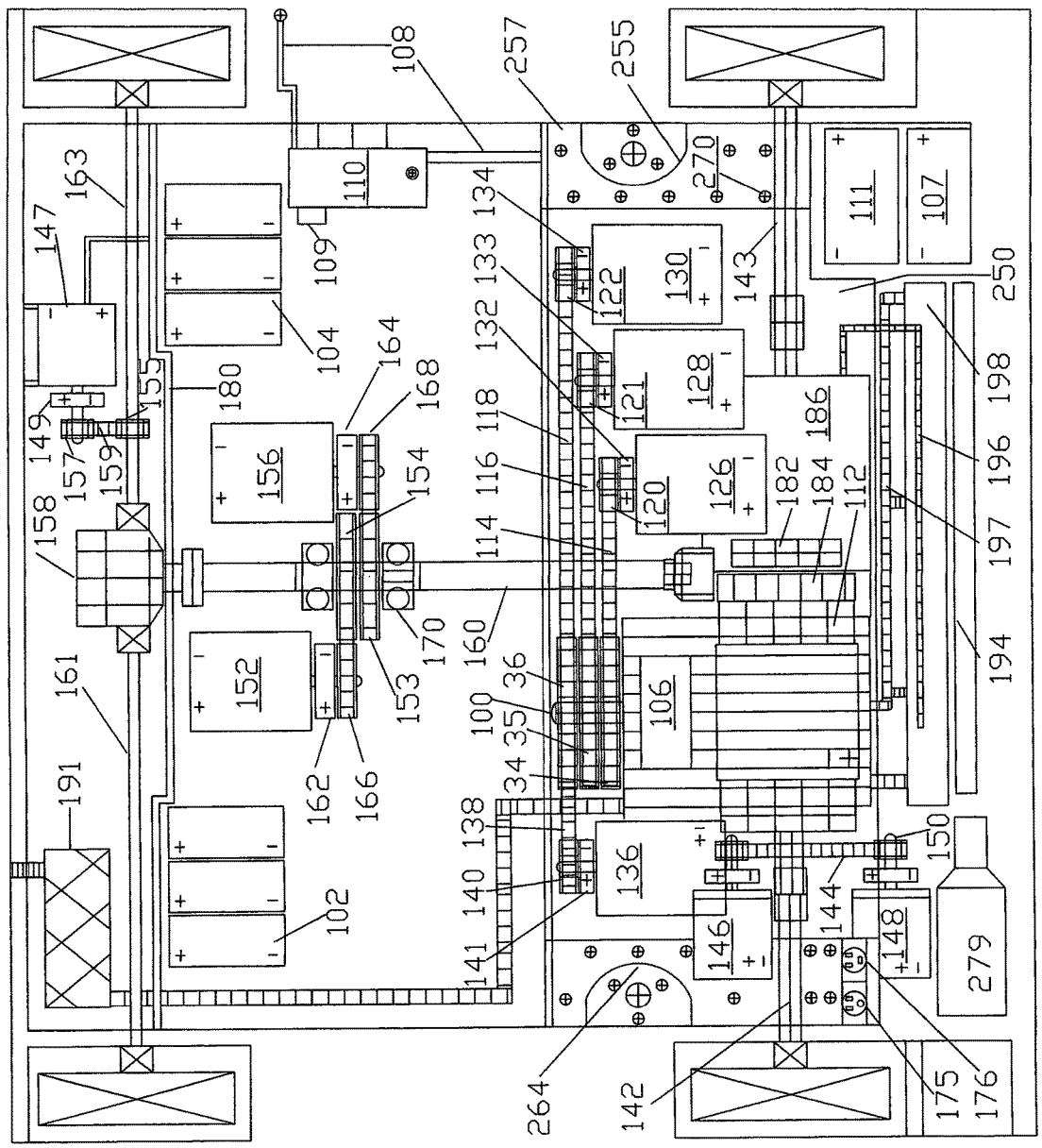

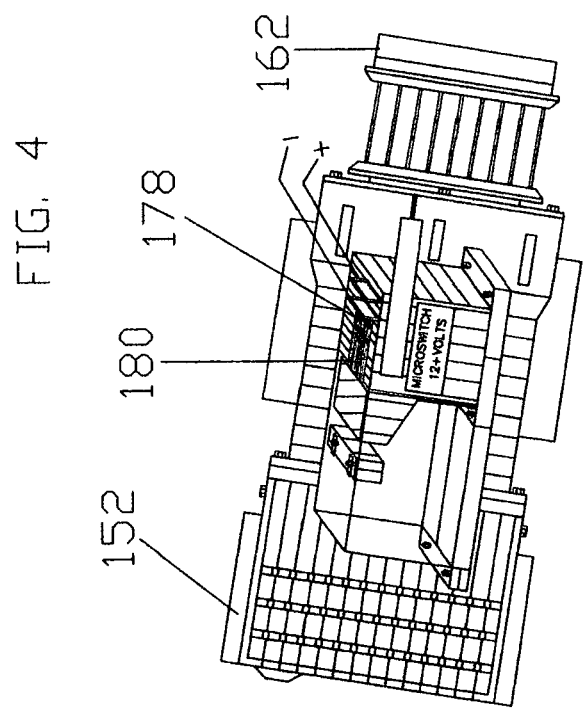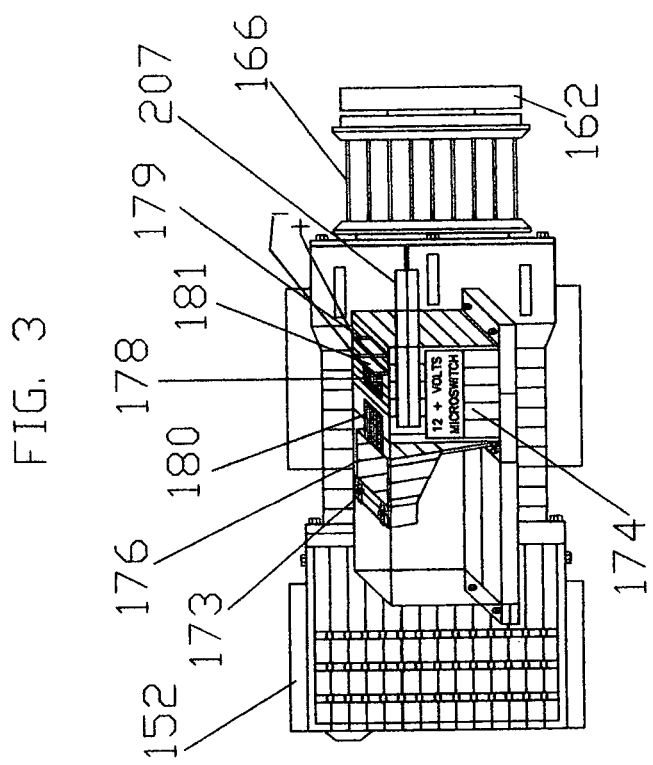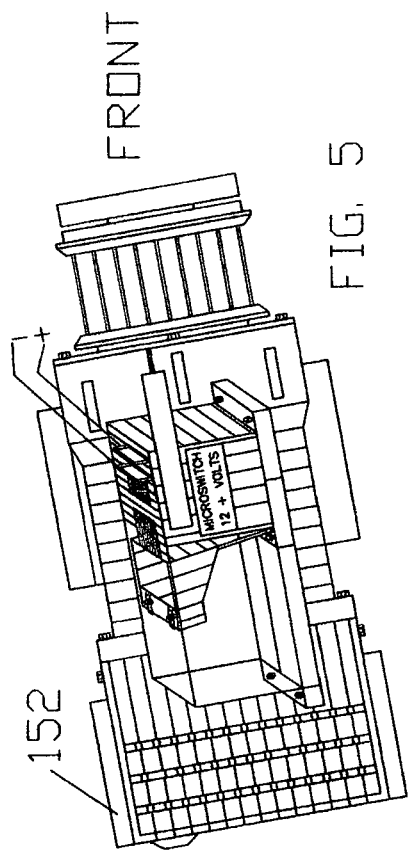

Correction made to Fig. 7
to correct 259 to made 258

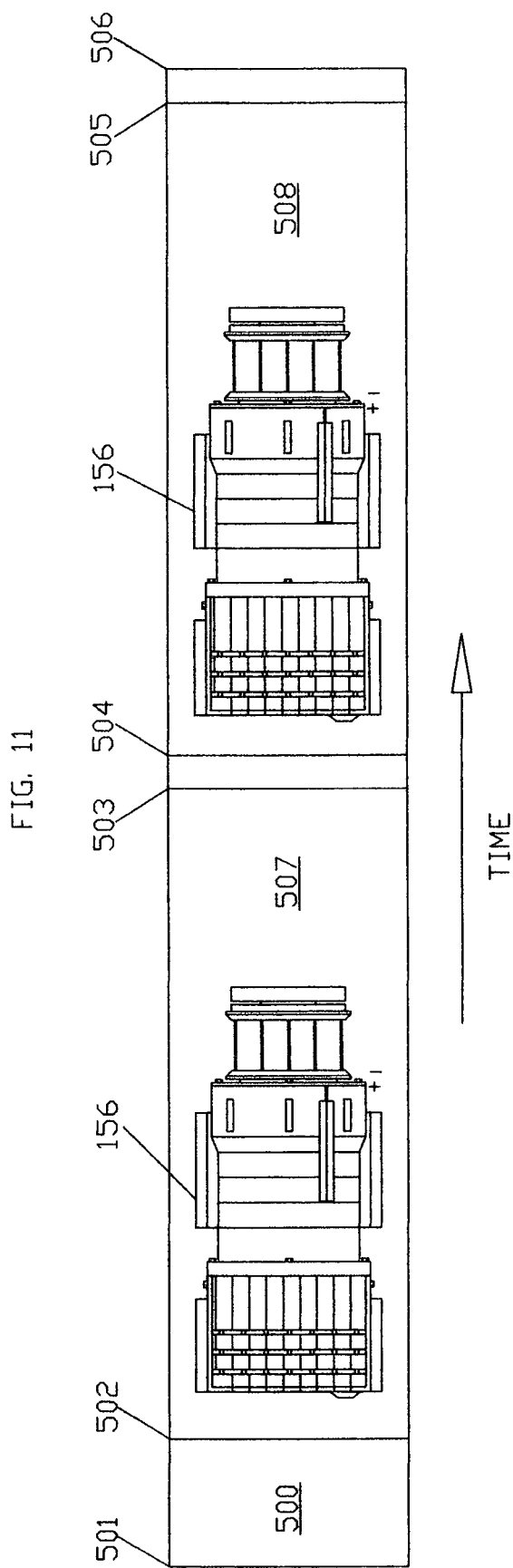
FIG. 11
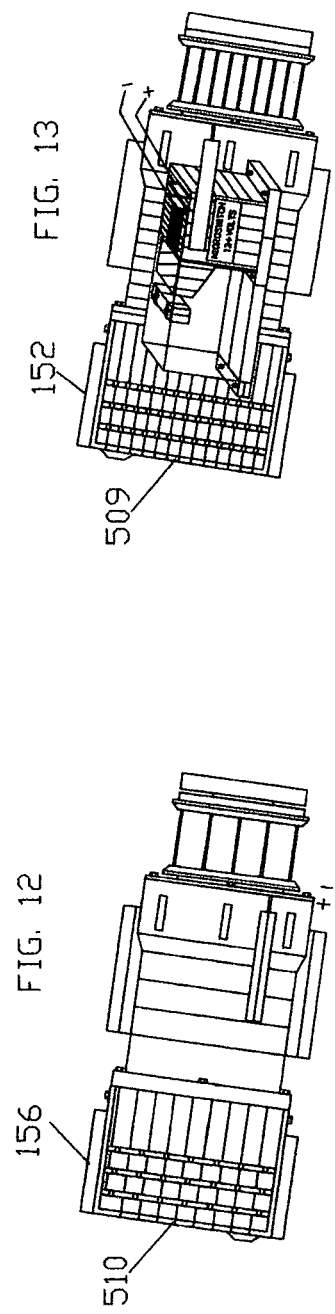
FIG. 12
FIG. 13

ALL ELECTRIC VEHICLE WITHOUT PLUG-IN REQUIREMENT

REFERENCE TO RELATED APPLICATION

This application is a continuation-in-part of application Ser. No. 14/314,907, filed Jun. 25, 2014, and the same is incorporated by reference in its entirety herein.

BACKGROUND OF THE INVENTION

A. Area of Invention

The present invention relates to electric vehicles applicable to consumer, commercial, and other applications.

B. Prior Art

The invention relates to an electric motor driven vehicle having one or more electrical energy battery packs, an electric motor, an electrical recharging device, e.g., an electric generator or alternator, and switches to provide a source of electric power to the motor from one or the other electrical battery packs while the non-power providing storage pack is being recharged and to methods of operation thereof.

With the growing concern over air pollution, petroleum shortages and other problems associated with gasoline, natural gas, diesel or other fossil fuel powered vehicles, the automobile industry is in the throes of devising power systems which are increasingly less dependent upon the internal combustion engine (ICE). There are at least three relevant alternatives presently available. One is a purely electric powered vehicle which, as presently designed and marketed, requires recharging from outside sources at frequent intervals. The other is the so-called hybrid vehicle which has both an electrical motor and a hydrocarbon burning engine; the one augmenting the other to produce greater mileage, and therefore less pollution, per unit of hydrocarbon consumption. There is a third, the hydrogen fuel cell powered vehicle, the efficaciousness of which is not yet proven.

Efforts to improve the self sufficiency of the purely electric powered automobile have produced a number of different designs, none of which promise to minimize or eliminate the necessity of frequent intermittent outside charging of their electrical storage cells. Certain designs rely upon an electric motor driving an electric generator through selective gear and clutch mechanisms. Other designs provide a generator powered directly by a free-running wheel. See, for example, Unsworth, U.S. Pat. No. 4,496,016. However, such designs do not disclose battery packs which are separately charged and separately supply electric power to the vehicle. These designs either do not provide circuit connection with electric storage packs nor do they demonstrate direct connection to a battery pack separably or independent electric power to the motor. See, for example, Al-Dokhi, U.S. Pat. No. 5,921,334. Certain further designs demonstrate charging of battery packs through regenerative action of braking wheels or coasting of free-running wheels while the motor or engine is idling. None of these demonstrate an ability to provide sufficient electrical recharging to minimize the frequency of recharging from an external source. Prior designs, to the inventor's knowledge, do not demonstrate a method of recharging an electrical battery pack which is independent of the driving motor in a disconnected manner and which maintains the entirety of the electrically powered drive system independent of the electrical charging system.

Other art of interest includes U.S. Pat. No. 4,119,862 (1978) to Gocho, which teaches an electric motor car in which an electric motor of the car is energized by a fuel engine driven generator and a battery is connected in parallel with the motor until charged by the generator. Gocho involves complex switching functions that can only be effected with an invertor and induction motor.

U.S. Pat. No. 6,886,647 (2005) to Gotta teaches use of a dual motor axle driven system in which the vehicle is powered by a first electric motor when the measured speed of rotation of the drive shaft is less that of a threshold value and is driven by second electric motors when such rotational speed is above the threshold value.

The present invention includes one or more of battery packs as well as one or more electrical recharging devices, each of which perform a separate and defined function in achieving optimal overall performance of the vehicle and in addition which required use therein of a fuel engine to facilitate additional performance of a minimum of two or more of the generators of the system. Unlike prior art braking energy regeneration systems, the present invention enables capture of otherwise lost energy of momentum which is available for re-capture during periods of absence of vehicle acceleration.

SUMMARY OF THE INVENTION

An electric powered vehicle includes at least three wheels, two front half axles between said front wheels including a transmission and a internal front differential medially disposed within said front axles (front wheel drive (FWD)). For a rear and all-wheel drive system with a single rear differential that is is medially disposed within said two rear half axles, and in between the two rear wheels, a drive shaft is in mechanical communication between said single rear differential and transmission. With a front wheel drive (FWD) system, the drive shaft is shorter and not connected to the transmission. The electric powered vehicle comprising at least one discrete battery pack capable of storing electric energy, said battery pack definable by energy values including a low value, a maximum value, and a defined minimum functional (DMF) value between said low value and said maximum value and a clean fuel engine operated by a supply of a clean fuel, the engine including a crankshaft. Also included is a first front generator 126 having a rotor in electromechanical communication with a crank shaft of said clean fuel engine 106, and an electric driving motor 112 ("EDM') receiving an electrical input from said first front generator 126. Electrical charge sensing means determines the charging condition of said battery pack between said values of low, DMF and maximum. Also provided are means for establishing an electrical communication between a starter of said clean fuel engine and first front generator 126 when a sensed charge of the battery pack falls to or below said DMF value.

The electrical vehicle also includes at least one second front generator 128, said generator in electromechanical communication with said crankshaft of said fuel engine during periods when no electrical communication exists between said EDM and said battery pack, said periods of lack of electrical communication including idle or neutral conditions of the vehicle, said at least one second generator having an output in electrical communication to said battery pack until said battery pack is fully charged.

Preferably also included is a first rear generator 152 in electromechanical communication with a rear drive shaft assembly, itself in mechanical communication with said vehicle drive shaft, said first rear generator 152 including a level orientation sensor and a rotational velocity sensor in communication with said drive shaft, said sensors in electrical communication between an output of said first rear generator 152 and said battery pack, said communication enabled upon any downhill motion of the vehicle above a predetermined operational velocity ("POV") determined by said velocity sensor; and a second rear generator 156 having an input in mechanical communication with said vehicle drive shaft, an input to second rear generator 156 in electrical communication with an accelerator pedal and an output of said rear generator 156 in electrical communication with said battery pack, said electrical communication from said second rear generator 156 to said battery pack enabled when no pressure is applied by a driver upon said accelerator pedal, permitting charging of the battery pack by said second rear generator 156 only upon a condition of zero acceleration.

The principal object of the present invention is to provide an improved source of energy through conservation and reclamation of mechanical energy lost by moving automobiles and other vehicles, particularly during periods of non-acceleration and to convert the reclaimed mechanical energy into electrical power useable by an electric vehicle.

It is accordingly an object to provide an improved electro-recharging system for vehicles.

A further object is of the present invention is to provide an improved all electric non-plug-in vehicle which utilizes the mechanical power produced but wasted by the car during periods of non-acceleration and converting it into electrical power for use in driving the car and for external needs.

Still another object is to provide an improved all non-plug in electric vehicle which reclaims the mechanical energy lost when the vehicle does not productively move or is not accelerated.

Still a further object is to provide an improved all non-plug in electric automobile which achieves lower cost of transportation through utilizing reclaimed mechanical energy, especially when the vehicle is going downhill or not accelerating.

A feature of the invention is a separate electro-recharging system for an all non-plug-in electric vehicle which functions when the vehicle is going downhill and is not accelerating so that the energy used to drive the vehicle uphill is again recharging the vehicle's batteries packs.

In another embodiment of the invention, the electro-recharging system is used to recharge the battery packs while the car is in motion when its battery packs fall below a predefined functional minimum charge. Also the battery packs can be recharged by idling of the vehicle's fuel engine when the vehicle is parked at any place, anywhere, anytime by manual, voice and or by remote control. (iphone or other remote control device.)

The aforementioned objects, features and advantages of the invention will, in part, be pointed out with particularity, from the following drawings, Detailed Description of the Invention and Claims herewith.

BRIEF DESCRIPTION OF THE DRAWINGS

FIG. 1D is a view, similar to that of FIG. 1C, showing a second input pulley to the backup fuel engine powertrain.

FIG. 1E is an enlarged plan view of FIG. 1.

FIG. 2A includes a rear driver side cruising generator, a rear passenger side downhill generator, a front driver side braking generator, a braking pedal and an accelerator pedal.

FIG. 3 is a schematic view of the passenger side rear generator shown in FIG. 2 when the vehicle is driving on a flat road.

FIG. 4 is a schematic view showing the operation of the passenger side rear generator when the vehicle is driving downhill.

FIG. 5 is a schematic view of the passenger side rear generator when the vehicle is driving uphill.

FIG. 11 is a timeline view of both rear generators operating over a defined distance on a flat surface during periods of acceleration, cruising and re-acceleration.

FIG. 12 is a view of the driver side rear generator during downhill operation.

FIG. 13 is a view of the passenger side rear generator during downhill operation.

DETAILED DESCRIPTION OF THE INVENTION

Front End Assembly

With reference to the schematic system view of FIG. 1, the start-up of a clean fuel engine 106 of the present system as well as functions following start-up of the electric vehicle, occur, in one mode of operation, when the level of charge of battery packs 102 and 104 falls to a defined minimum functional ("DMF) level of the maximum possible charging or safe capacity thereof, for example, by about 30% or below about 70% of total safe charging capacity; this varies with vehicle type. However, at a typical time of original start-up of the vehicle such as at the beginning of a work day or a new operating period, the battery packs 102 and 104 will have been recharged during the previous night or through a brief period of operation by the fuel engine 106 (more fully described below) which is typically a water-cooled engine operating upon any liquid or gaseous hydro-carbon fuel including gasoline, diesel, ethanol, natural gas or the like. In the event of a breakdown of the fuel engine or any supporting component, the option will exist to facilitate recharge of the battery packs by direct current re-charging from a DC charge station or at a home or place or business of the owner if it is already equipped with such DC charging capabilities. However, an important objective of the present invention is to free electric vehicles from the necessity of frequently re-charging the battery packs thereof from an external source of DC or AC power which, generally, is costly, inconvenient and in most locales does not exist.

Figure 1:
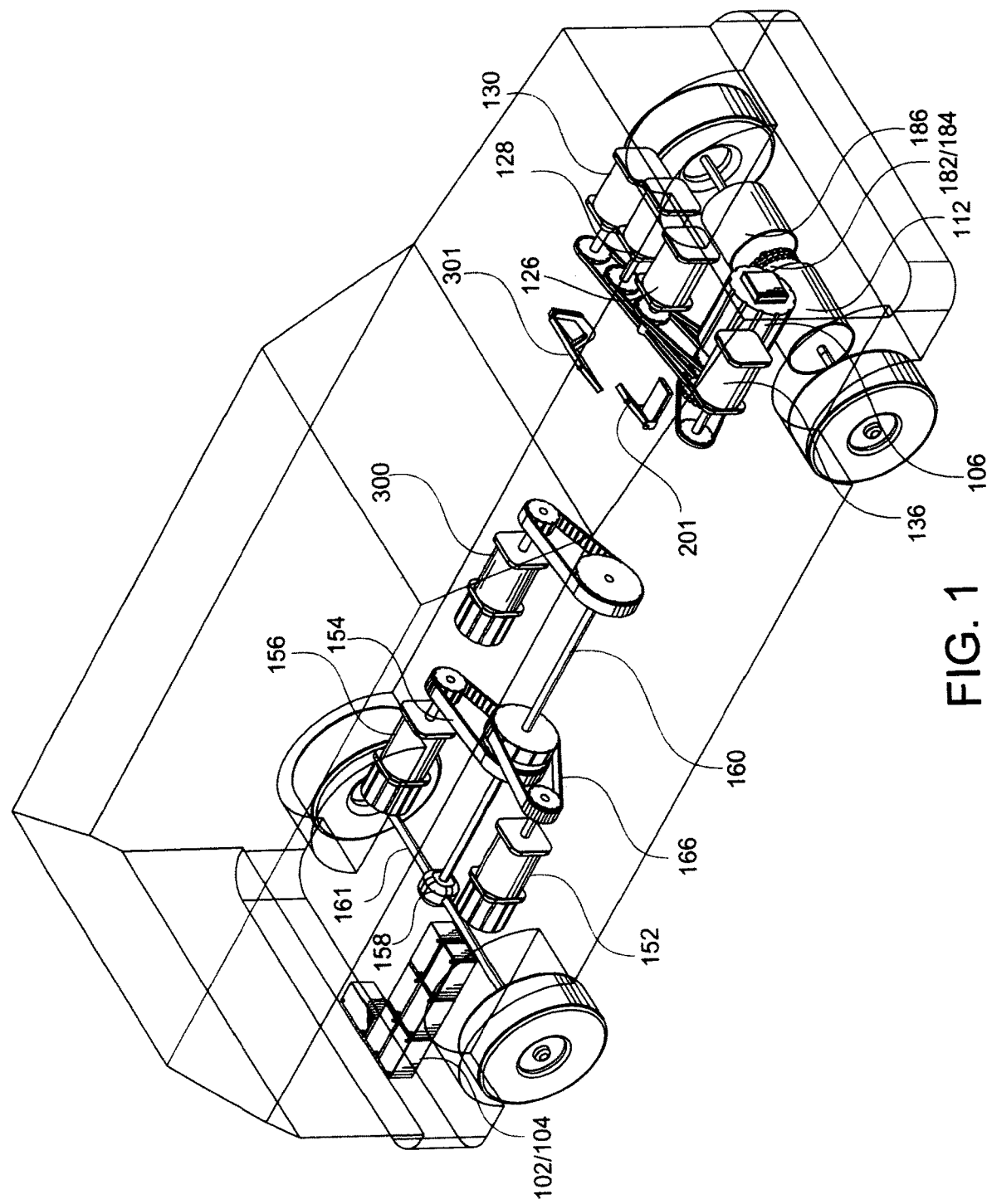
FIG. 1 is a schematic view of the material components of the present electric vehicle.
Figure 1A:
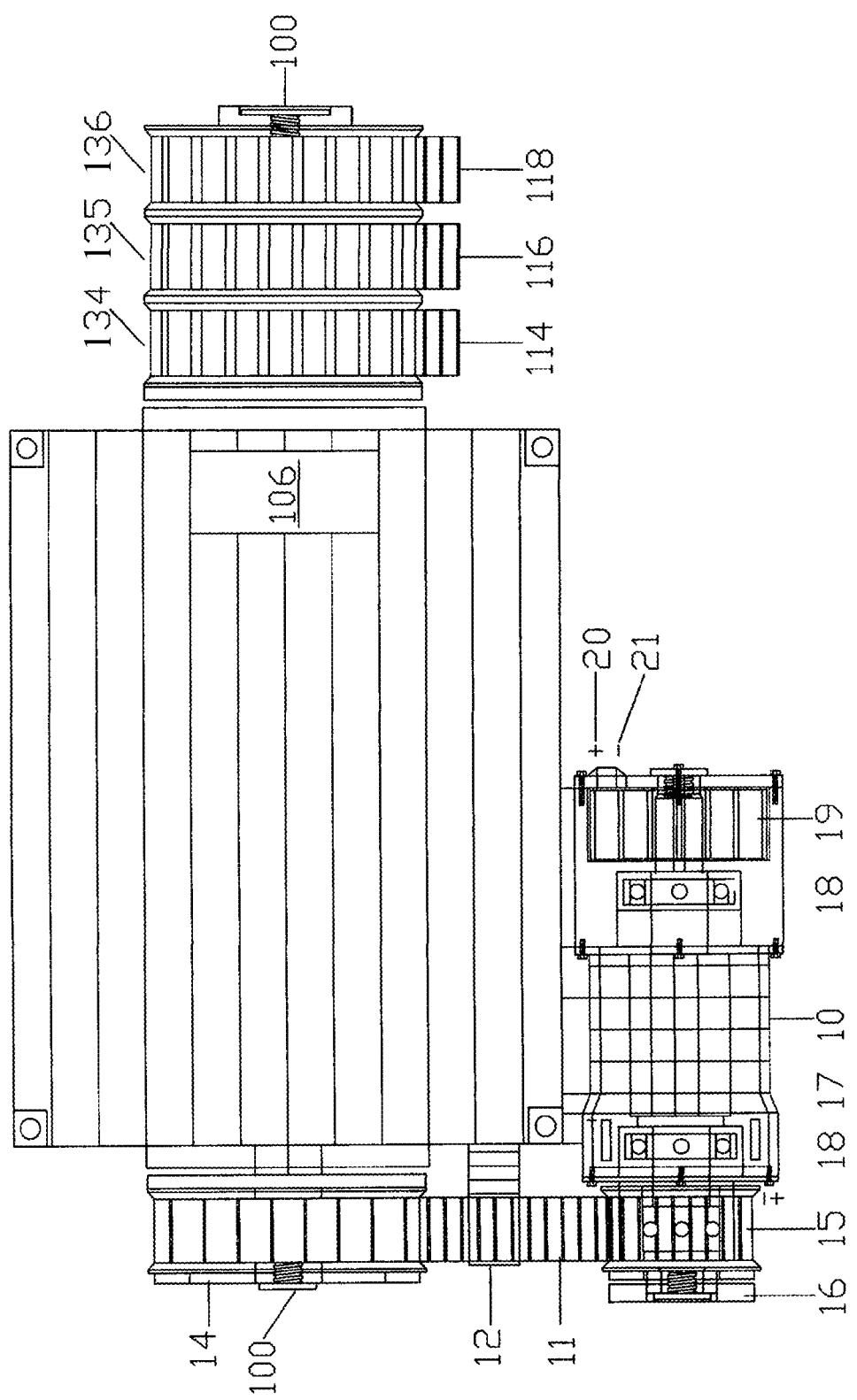
FIG. 1A is a schematic view of a fuel engine and 12+ volts all in one starter/alternator at the right rear of the backup fuel engine, employed in the system of FIG. 1.

As shown in the views of FIGS. 1 and 1A (described below), said fuel engine 106 is activated to start by a 12 volt electric starter 10 and belt drive 11, powered by a 12 volt battery 107 (by a key ignition or push button switch (not shown). Fuel engine 106 receives fuel from fuel line 108 from fuel tank 110 which employs a fuel pump 109. Typically, when the vehicle is started and begins to move, all electric power is supplied from the battery packs 102/104 to electric driving motor ("EDM") 112 since, at that point, the battery packs are fully charged or at least charged to or in excess of their defined minimum functional ("DMF") charge. However, in the event that the battery packs, for whatever reason, at the time of starting the vehicle or otherwise, are depleted to below their DMF level, then the back-up fuel engine 106 is activated by computer means, and belts 114, 116 and 118 begin to turn respective gear clutch pulleys 120, 121 and 122 connected to respective electric clutches 132, 133 and 134, and to respective front generators 126, 128 and 130. At this point, none of said generators produce any electricity since there is no load upon them and therefore none of the internal rotors or bearings of these generators are turning.

In a matter of milliseconds following the activation of first front DC generator 126 by electric clutch 132, a timing gear drive belt 114, connects to crankshaft 100 and first pulley 34 of clean fuel engine 106 and generator 126 will begin to produce electric energy which then is furnished to EDM 112. In other words, the sole function of first front generator 126 is that of providing electric energy to the EDM 112. In a matter of milliseconds thereafter, both battery packs 102/104 are disconnected from the EDM 112. When both battery packs are electrically disconnected from the EDM 112, second front generator 128 and its timing gear electric clutch 133 are activated which, in turn, causes the rotor and bearings of second front generator 128 to begin to turn and charge one or both of said battery packs 102/104. Momentarily thereafter, the third front generator 130 is similarly activated by its timing gear electric clutch 134. All timing gear electric clutches operate off a standard 12+ volt electrical battery system 107 and fuse box 111 of the vehicle shown to the lower driver side of FIG. 1E (as viewed from the front of the car). Thereupon, the battery packs 102/104 are charged by both the second front and third front generators 128/130 with a timing gear belt drive connection to the crankshaft 100 and pulleys 34/35/36 of fuel engine 106 through generator timing gear pulleys 121 and 122 of respective timing gear electric clutches 133 and 134. The pulleys 34/35/36 can be constructed in one unit if desired. All timing gear belts 114/116/118 can be made as one belt unit to drive all timing gear pulleys 120, 121 and 122 at the same time. (See FIG. 1E). All belts, single or multiple, include a belt tensioner.

The above process continues until the battery packs are charged to full capacity whereupon the system computer turns off the first DC generator 126 since it is no longer needed and the electric clutch 132 is disengaged. The fuel engine 106 continues to run and operate second and third generators 128/130. As such EDM 112 will resume operation with all power therefore supplied by the battery packs. During a brief transition period, the second and third generators 128/130 operating off the fuel engine 116 continue to charge the battery packs. However, within a few seconds, front generators 128 and 130 are disconnected, as is the fuel engine. Said generators and all moveable parts therein are disengaged.

Of particular importance regarding the function of fuel engine 106 is that it can operate while the car is in neutral, idle, park or in drive and, thereupon, when so instructed by the control panel (as described below), second and third generators 128 and 130 will operate to recharge the battery packs, typically for a few minutes while at traffic lights (as in "a stop-start" system) or less than 20 minutes when driving to accomplish a complete re-charge of the battery packs and completely obviate the need for an AC or DC re-charging station or facility. Thereby, an electric vehicle of the present nature, even if it were to require a fuel tank 110 of five gallons or more, would yield a long driving range and high m.p.g. transportation in excess of any attainable with present day hybrid, all electric or regular fuel vehicles, essentially negating the possibility that a driver could be stranded in an isolated area because of the absence of an AC/DC charging station or facility.

When the fuel engine is running, at the passenger side of the fuel engine, pulleys 20, 21, and 22 may be seen to include a small timing belt 138 which turns an electric clutch gear pulley 140. At this time, A.C. generator 136 is not producing any electric energy and, as well, its internal rotor and bearings are not turning. A pulley 150 is on the passenger side of the EDM 112 as is EDM rotor shaft 149. Also seen is an electric clutch 145 in cooperation with pulley 140. Upon actuation of the electric clutch, 145 AC compressor 146 is actuated to cool the vehicle inside. A belt 144 connects to pulley 150, said electric clutch 145 and said pulley 140 of alternator 148.

Under conditions of the use of a 12 volt alternator 148, compressor 146, car lights, power brakes, electric or mechanical pumps in the system, and power steering are functional. 120V and 240V AC outlets 175/176 are powered off of said AC volts generator 136, and it is powered by clean fuel engine 106. However, at a typical time of original start-up of the vehicle, such as at the beginning of a work day or a new operating period, the battery packs 102 and 104 will have been recharged during the previous night or through a brief period of operation by the clean fuel engine 106 (more fully described below) which is typically a water-cooled engine operating upon any liquid or gaseous hydro-carbon fuel including gasoline, diesel, ethanol, natural gas or the like. In the event of a breakdown of the fuel engine or any supporting component, the option will exist to facilitate recharge of the battery packs by direct current re-charging from a DC charge station or at a home or place or business of the owner if it is already equipped with such DC charging capabilities. However, an important objective of the present invention is to free electric vehicles from the necessity of frequently re-charging the battery packs thereof from an external source of DC or AC power which, generally, is costly, inconvenient and in most locales does not exist.

That is, AC generator 136 is preferably mounted at the passenger side of the clean fuel engine 106. Said generator receives rotational mechanical input from clean fuel engine 106 through timing gear belt 138. 120-volt AC and 240-volt AC electrical outlets 175 and 176 are water proof sealed and covered. Either or both outlets may be used by equipment of interest to home owners, campers, construction workers, law enforcement, and others. The AC 120/240 volts generator 136 is for the sole purpose of supplying electric energy to the external needs of homes, tools, machinery, lights, and to vehicles that are out in the field and whatever their needs may be. If DC electric power is needed then one or more of the DC generators 126/128/130 can be used to supply DC electric power. (See FIG. 7). For example, if one needs to recharge the external battery packs in a short time then one can connect DC cables to the DC generators and to the outside of the external battery packs. Thus one will always have a source of electric energy of both AC and DC and, as well, the vehicles will be totally independent of any external electric power source.

Rear End Assembly

Wholly independent of the above-described operation of the EDM 112, clean fuel engine 116 and the first, second, third and fourth front generators 126/128/130/136, are a passenger rear downhill generator 152, a driver side rear cruising generator 156 a driver side front braking generator 300 each of which provides independent recharging capabilities under defined conditions. As may be noted at the rear of FIG. 1 and FIG. 2A mechanical power is applied to these generators by the rotation of rear driveshaft 160 and rear differential 158 which is powered by rear axles 161/163. (See FIG. 1E, FIG. 2 and FIG. 2 A) downhill generator 152 cruising generator 156 and braking generator 300, are employed with a 12+ volt timing gear electric clutch 162 164 and 304 together with corresponding timing gear pulleys 166, 168 and 305,153/154 and 306, downhill timing gear belt 165, cruising timing gear belt 167, braking timing gear belt 169, passenger rear downhill generator 152, driver side rear cruising generator 156, driver side front braking generator 300 and their drive shaft bearing supports 166 which activate the rear DC generators 152 156 and 300, see FIG. 2A. Using an electric harness, these generators are matched in voltage and other electrical parameters of the two battery packs of batteries shown in FIG. 1, FIG. 1 E, and FIG. 2

If the vehicle is moving at more than a predetermined operational velocity ("POV") such as 30 miles per hour on downhill roads (see FIG. 4), the vehicle enters into a "recharging downhill mode" regardless of acceleration or lack thereof, and rear passenger generator 152 is activated, thus commencing a further mode of recharging of the battery packs. At this time the EDM 112 is reduced to its lowest possible idle condition since the vehicle is, in essence, simply rolling downhill and as generator 152 is recharging the battery packs. Therein, energy is produced at a faster rate than the EDM is consuming it.

Figure 2:
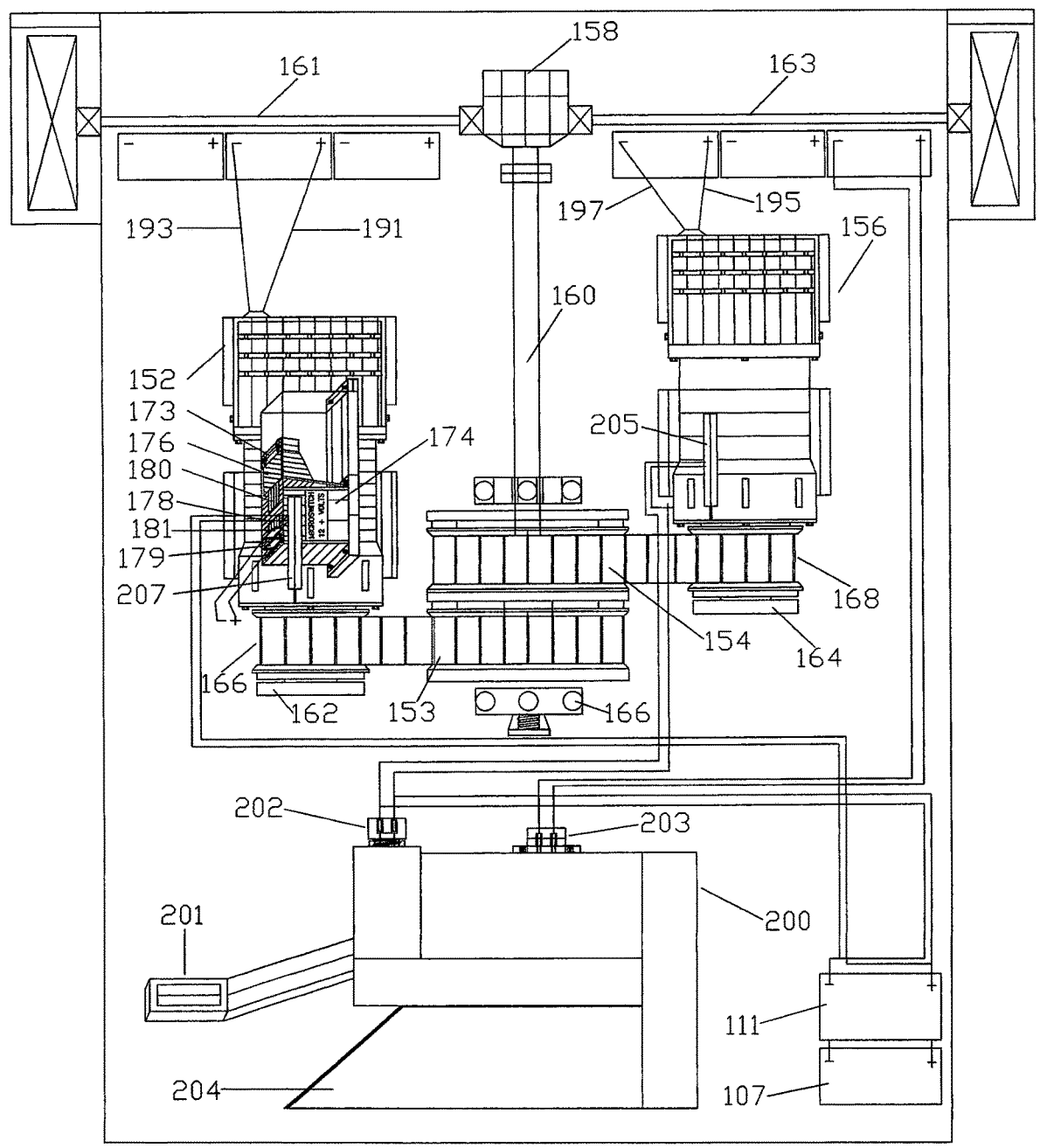
FIG. 2 is a schematic view of the assembly, driver side rear generator, and breakaway view of the passenger side rear generator, together with associated components. Therein, the driver side rear generator only functions when the accelerator is released.
Figure 2:
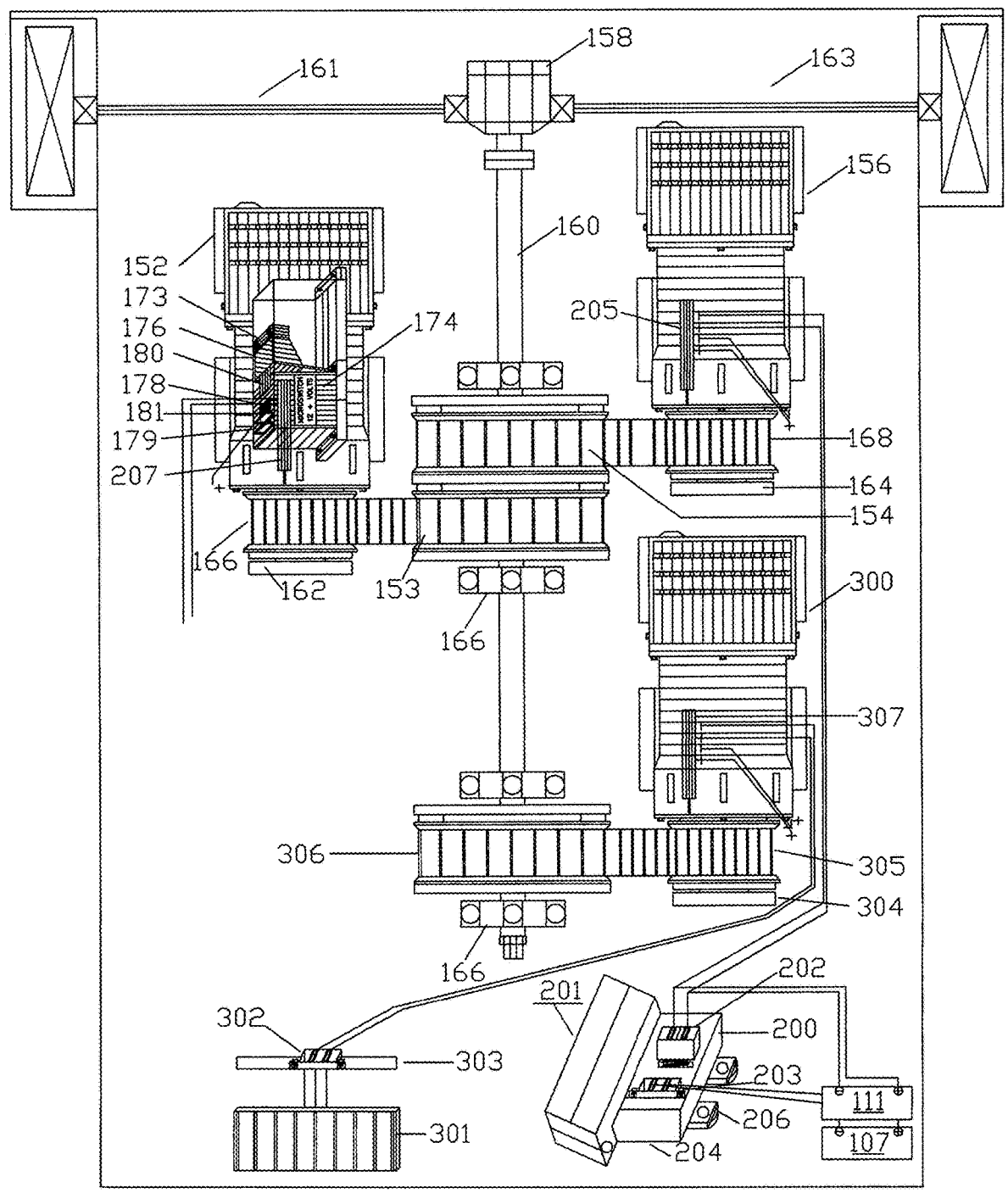

At the driver side is a "recharging cruising mode" rear generator 156 that is controlled by an electronic accelerator pedal assembly 200 (see FIG. 2). When the vehicle is on a level, small uphill grade, or downhill road at, for example, 30 miles per hour or more and the driver fully releases the accelerator pedal 201, it activates an electric switch 202, activating electric RPM sensor 205 and activating electric clutch 164, enabling the rear driver side generator 156 to re-charge the battery packs. Pedal assembly 200 includes an rpm sensor 203 for the electric drive motor (EDM). When the driver reactivates the accelerator pedal 201, then electric switch 202 deactivates the RPM sensor 205 and it deactivates the electric clutch 164 of generator 156, and whereupon internal parts of that generator 156 stop moving, minimizing any unnecessary strain, stops, or wear and tear on the generator 156. If the vehicle is even slightly accelerating, rear generator 156 cannot function and thus no strain exists on the EDM and its components. But, the faster the speed of a vehicle during cruise mode (without acceleration), the more electric energy is recharged back into the battery packs through electrical outputs 195/197. It is noted that when the vehicle is in cruise mode, the EDM 112 reverts to a low idle internal rotation and, at such time, makes little use of energy from the battery packs since rear wheel drive shaft 160 is the primary source of power at that time. It is noted that both rear generators 152/156 will function if the vehicle is moving downhill at more than the POV and without contact with the accelerator.

It is to be appreciated that the rear generators 152 156 and 300 each have distinct re-charging functions. The cruising generator 156 can operate to re-charge the battery packs if the foot of the driver is lifted off the accelerator pedal 201 (see FIG. 2 A) In addition, passenger downhill rear generator 152 functions strictly on the basis of orientation of the vehicle relative to a horizontal driving position, regardless of the position of the accelerator pedal. More particularly, as shown in FIGS. 3-5, passenger side generator 152 is provided with a small 12+ volt orientational micro switch 174 which limits the recharging of the battery packs 102 and 104 from the generator 152 to downhill driving only. This in addition is more particularly shown in FIG. 4. In essence, switch 174 is a single axis level sensor in which the effect of gravity operates to move inertial weight 176 thereof from its normally open position shown in FIGS. 2, 3 and 5 to its closed position shown in FIG. 4 which can only occur when the inertial weight 176 moves forward responsive to the effect of gravity during a downhill orientation of the vehicle. Thereupon, front and rear contacts 178 and 180 respectively of the switch 174 close bringing positive electrode 179 into contact with negative electrode 181, thus closing switch 174, and communicating this through contact 207 thereby engaging the generator and permitting it to recharge the battery packs, regardless of whether the accelerator pedal is depressed or not. Element 173 is a stop and adjustment means for inertial weight 176. One may also program a 30 mile per hour downhill velocity ("POV") condition into the activation requirement so that generator 152 will not be prone to rapidly turn on and off responsive to every small downhill slope or bump that the vehicle may encounter. As may be further seen in FIG. 2A, the energy input to passenger downhill generator 152 is enhanced by differential 158, rear wheel drive shaft 160, its associated with timing gear pulley 166 and timing gear electric clutch 162 which functions off of timing gear pulley 153. The electrical outputs of generator 152 are shown at connections 191/193 to the battery packs. FIG. 2.

A special-purpose accelerator assembly 200 (described below) is employed to assure that the rear generator 156 can operate only if all pressure is removed from the accelerator pedal 201.

As above noted, the function of driver side rear generator 156 is to permit recharging of the battery packs only if (1) when the vehicle is cruising on a substantially flat surface, small uphill grade or in downhill operation and, (2) the accelerator is not engaged. See FIG. 2. Both conditions will commonly occur in highway driving particularly when the vehicle has gradually slowed-down because of traffic conditions, or is approaching an exit off a highway or traffic light. During such conditions, the accelerator pedal is not engaged and true cruising, within the contemplation of the present invention, occurs. This is facilitated by contact 205 which permits recharging of the battery packs at contacts 195/197 when the above cruising criteria are met. Once deactivated, the electric clutch 164 and the driver side generator 156 are deactivated and all internal parts thereof stop turning, as does any connection to the rear pulley 154 on drive shaft 160. With respect to generators 152 and 156, appropriate battery power level sensing means are well-known in the art and either or both of the rear generators that are otherwise active are deactivated when the battery packs are charged to their designated maximum value.

Cruising and Downhill Recharging Distance

With regard to FIG. 11, the vehicle moves on a level surface from 0 to 45 mph over a distance 500, as the driver depresses accelerator pedal 201 of accelerator pedal assembly 200 and EDM 112 then increases its rpm and moves the vehicle forward. The driver keeps accelerating from point 501 to point 502 at which the driver releases the accelerator pedal 201 activating electrical switch 202 of assembly 200. See FIG. 2. Electrical switch 202 then activates the DC generator 156 and starts recharging the rear battery packs 102/104. The recharging distance points of DC generator 156 from 502 to 503, shown in FIG. 11 are always longer than the accelerating distance of point 501 to 502. Once the driver desires a lower speed, he accelerates and again thus DC generator 156 is deactivated and does not further recharge the battery packs 102/104. When the driver again accelerates from point 503 to point 504, this distance is much shorter than the original distance 500 of points 501 to 502 due to the vehicle's higher speed. At point 504, the driver releases accelerator pedal 201 and electrical switch 202 again activates the DC generator 156 and it starts recharging the battery packs 102/104 again. The recharging distance points of DC generator from 504 to 505 which are the same as points 502 to 503. By this example, it is to be appreciated that driving habits can be modified to increase the recharging from the DC generator 156 to the battery packs 102/104 by a very high percentage and the EDM will always receive a high enough battery charge to propel the vehicle for considerable extra mileage relative to prior art electric vehicles.

FIG. 11 shows the DC generator 156 in a flat orientation 507 until the driver releases the accelerator pedal 201. The DC generator 156 is then activated and starts the recharging of the battery packs 102/104. FIG. 11 also shows DC generator 156 in a flat orientation 508. Same as orientation 507.

When generator 152 reaches downhill, the angle of orientation 509, then the micro switch 174 activates DC generator 152 and starts the recharging of battery packs 102/104. In FIG. 12 at level 510 generator 156 starts recharging as soon as pedal 202 is released. Thus both generators 156/152 are functional. That is, both generators 152/156 recharge the battery packs 102/104 when the conditions of both FIGS. 12 and 13 are met, providing a maximum of electric energy to the battery packs 102/104 while the EDM uses a minimal or no energy from the battery packs. Therefore the two generators 152/156 recharge the battery packs faster than the EDM is using energy. Thus, the battery packs are maintained at a high level of charge for the EDM to use. When the orientation of generators 152/156 levels off, then generators 152/156 are both disconnected from recharging the battery packs. When generators 152/156 are in a recharging mode they will never be a drain on the EDM.

Viewed generically, the present vehicle, through generator 152 provides charge to the battery packs but does not engage to charge them during uphill and flat surface driving, but will recharge the battery packs when driving downhill. Generator 156 is activated when cruising, slowing down and braking during deactivation of the accelerator pedal 201. This is an inexpensive and efficient use of the rear generators, without any energy cost from the EDM, battery pack, the inertial momentum of the vehicle, rotation of the vehicle's wheels 22, the differential 158 or drive shaft 160.

The effectiveness of EDM 112 may be further increased through the use of a special mounting plate 184 (see FIG. 1) to interface to the extended rotor shaft 149 of the EDM 112, connect to a torque convertor 182 of an automatic transmission 186 and or connect to a clutch disc system for a standard transmission, driven by two front half axles 142/143. See FIG. 1.

During a start-up or early period of operation, if the battery packs are not fully charged, clean fuel engine 106 will function not only to power first front generator 126 which in turn will power the EDM, but also to power second front generators 128 and third front generator 130 whose sole function is to recharge the battery packs 102/104 until they reach full charge. Thereby, maximum efficiency is derived from any clean fuel source used in tank 110, fuel lines 108, and from fuel pump 109, thus minimizing overall usage of clean fuel and enhancing efficiency and longer life of the battery packs.

Under such conditions and, of course, continuing downward to the DMF level of depletion of, for example, 30% of minimum charge, the vehicle is fully propelled through the operation of EDM 112 and the battery packs.

Also provided is a separate cooling assembly for the battery packs 102/104 and for generators 152/156. This includes a 12 v air conditioner compressor 147 powered by electric clutch 149, electric clutch gear pulley 159, axle gear pulley 155, belt 157 and a sealed bottom metal/plastic cover that is installed under the body/chassis which, forms a complete bottom sealed compartment 190 with a separate opening above to the inside of the vehicle, and a inside cover (not shown) for ease of access and total protection of all electrical components (as mentioned above) from damages, due to accidents, debris, water or fire. More generally, when the vehicle is moving and the battery packs 102/104 and generators 152/156 are in use, eventually the battery packs and generators 152/156 reach a certain higher temperature. Then the air compressor 147 is activated by a thermostat that is installed inside the battery packs and generators' compartment, and cool air is then provided into the sealed compartment 190 which comprises a true separate special miniature air cooling system due to the small air cooling space involved. Part of the rear air cooling system can be connected to the main front air conditioner system 146. When the temperature reaches a normal level then the air compressor 147 is disconnected. With this system, the battery packs and generators can be controlled to an exact temperature to minimize the electrical losses and damage due to heat. All items, as above, can be installed at different places depending on the vehicle to address issues of servicing and or replacements of parts.

Starter Alternator

In FIG. 1A, there is shown an alternate embodiment of the present invention in which an electric starter 10 and said alternator 148 are integrated into a single 12+ volt system including a timing gear electric clutch 16 and special cooling fan 19. There may be seen a timing gear belt-driven 12+ volts starter-alternator ("SA") 10 which includes a matched 12+ volts timing gear electric clutch system 16, a timing gear clutch pulley 15, belt 11, belt tensioner 12, rear crankshaft extended shaft 100, and rear extended crankshaft timing gear pulley 14 operating off of fuel engine 106.

More particularly, the present SA 10 is preferably disposed toward the side of the fuel engine 106 facing the front of the vehicle and, as above noted, upon crank shaft 100 of fuel engine 106 operating off of its crankshaft rear timing gear pulley 14. The SA may be installed upon either side of the backup clean fuel engine 106. In other words the location in FIG. 1A at the driver side of the vehicle represents but one of several possible locations of the SA.

Figure 1B:
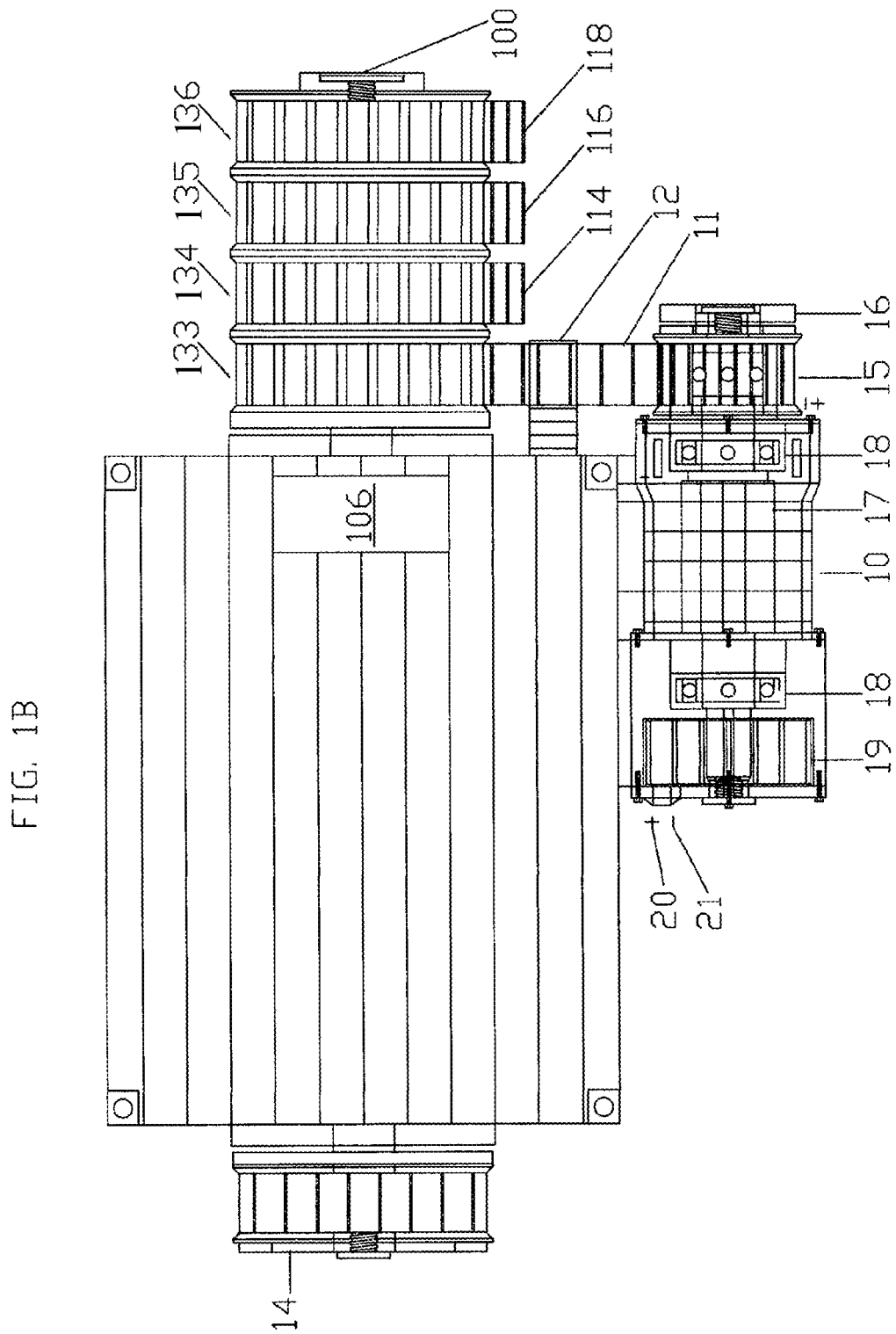
FIG. 1B is a schematic view of the SA of FIG. 1A, however showing the location of the SA at the right front of the backup fuel engine, engaged with the powertrain thereof, in which the powertrain includes multiple input pulleys.

In FIG. 1B, the SA 10 is on the driver's side of the fuel engine 106 facing to the rear of the vehicle. An additional pulley 23 and belt 24 is added to the crankshaft 100 of fuel engine 106 and belt tensioner 25 is installed to the fuel engine 106.

Figure 1C:
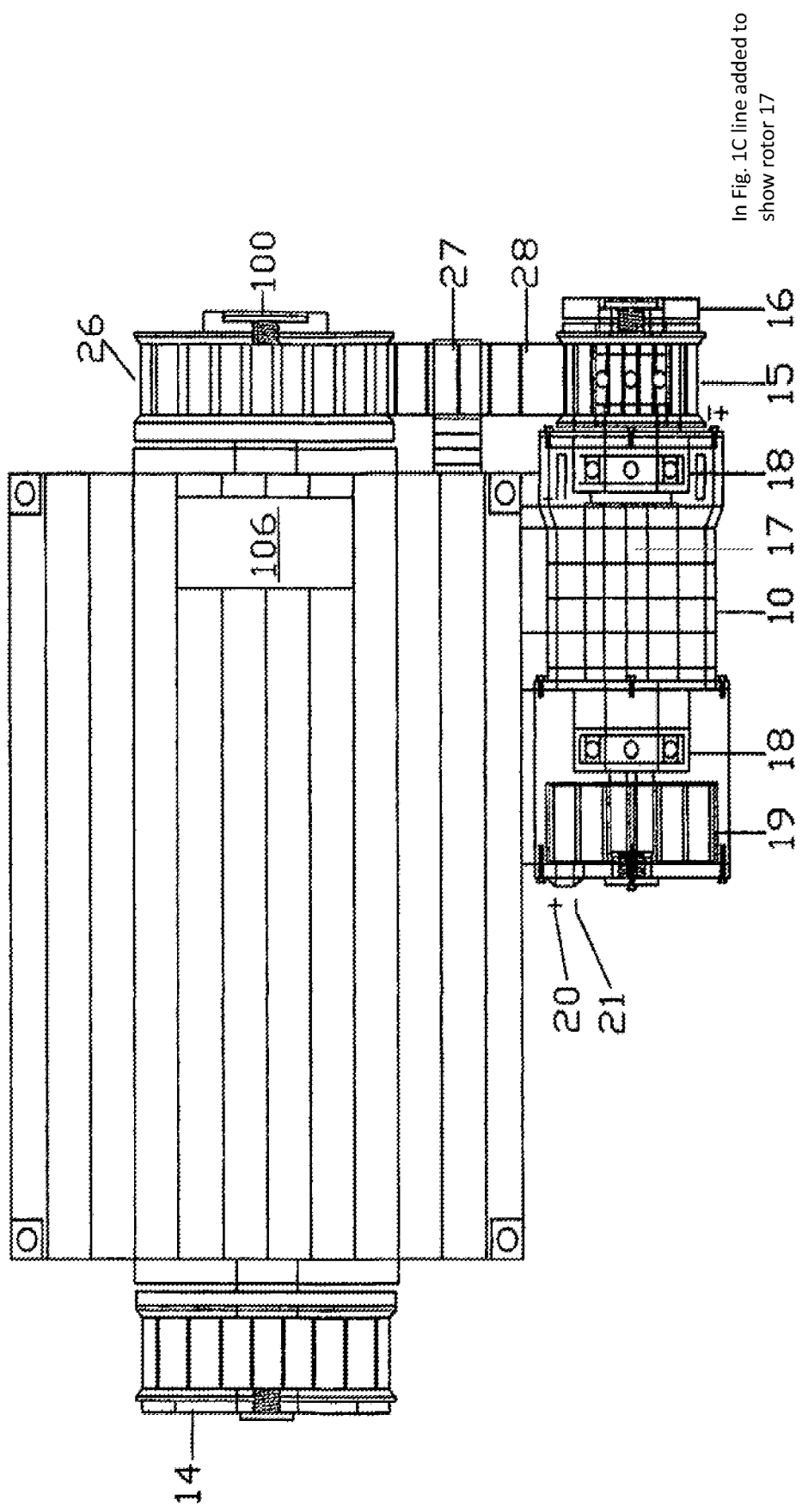
FIG. 1C is a schematic view of the SA of FIG. 1B, however attached SA is at the right front to a single input pulley of the backup fuel engine powertrain.

In FIG. 1C, the SA 10 is on the driver's side of the fuel engine 106 facing to the rear of the vehicle. Only one pulley 26 and one belt 28 is on the crankshaft 100. A belt tensioner 27 is installed to the fuel engine 106 and belt 28 drives all DC generators 126/128/130.

In FIG. 1D, the SA 10 is on the driver's side of the clean fuel engine 106 facing to the rear of the vehicle. Only two pulleys 29/30, and belt 31 are on crankshaft 100. See FIG. 1 C. Belt tensioner 12, FIG. 1 B, FIG. 1 A is installed on clean fuel engine 106 and applies pressure to belt 11. Belt tensioner 12 is the same for all belts connected to the starter/alternator and timing gear pulleys 29/26/33/14. Belt 31/32 are on crankshaft timing gear pulleys 29/30 of crankshaft 100 of clean fuel engine 106. Pulleys 34/35/36 (FIG. 1A/FIG. 1E) and belts 114/116/118 drive all DC generators 126/128/130.

The SA 10 can be installed anywhere on the fuel engine 106 on the right side on the top or on the left side. SA 10 can be installed at same positions in front or rear.

The fuel engine 106 may be activated and deactivated from the "Energy Recharging Control System" (ERCS) 300 which functions with a "PIN Number Control System" (PNCS) on the dashboard. See FIG. 10.

When a driver needs to activate the fuel engine, one can do so manually or by voice when electrical need is required to the outside, one first opens the front hood to access and install the 120/240 volts extension cables into the two AC electrical outlets 175/176. Driver enters his number and pushes a "start fuel engine" button on the dashboard. The (ERCS). The fuel engine then starts and a about second later the AC generator 136 is activated by the clutch system 141 and starts supplying 120/240 volts of electric energy to the SA. To the electrical outlets 175/176, 120/240 volts extension cables may supply electric power to any external need, e.g., tools, home power to any external needs, tool, home power and the like. Extension cables can be connected or disconnected before or after the fuel engine starts or stops.

When clean fuel engine 106 requires activation, the 12+ volts SA receives electric energy to a rear plug-in connection 20/21 from an electrical harness (not shown). The next second the rotor 17 is activated. In milliseconds the timing gear electric clutch 16 is activated, then timing gear electric clutch pulley 15, timing gear belt 11, belt tensioner 12, and timing gear pulley 14 on rear extended crankshaft extension 100 all turn and quietly activate the clean fuel engine 106. After the engine is activated, timing gear electric clutch 16 returns to its inactive position. Timing gear pulley 14, belt 11, belt tensioner 12 and timing gear electric clutch pulley 15 continuously run until clean fuel engine 106 power is disconnected. Further, the 12+ volt electric rotor 17 and rotor bearings 18 are deactivated, thus reducing wear and tear upon components of the assembly and energy in the operation thereof. However, when the 12+ volts battery 107 is at a lower power state, then the SA is activated and starts the clean fuel engine 106 by activating the timing gear electric clutch 16, SA 10 will activate and recharge battery 107 until further charging is not required.

Once the 12+ volt battery 107 is fully re-charged, then electric clutch 16 is disconnected, and rotor 17 and rotor bearings 18 of SA 10 stop turning, as described above. As such, with this system, there is no need for a conventional alternator as that of alternator 148 described above, thus representing a significant saving to manufacturers of electric vehicles. A further benefit of the SA is that it does not need to be installed in close proximity to fuel engine 106 but, rather, may be installed at any under-the-hood location so long as appropriate mechanical contact between pulleys 15 and 13 can be assured. This may be desirable in situations where the electric SA is exposed to conditions of heat, moisture, debris and the like. As such, the SA 10 will last longer than a typical alternator and starter thus reducing potential warranty costs to the manufacturer.

Support Assembly

Figure 6:
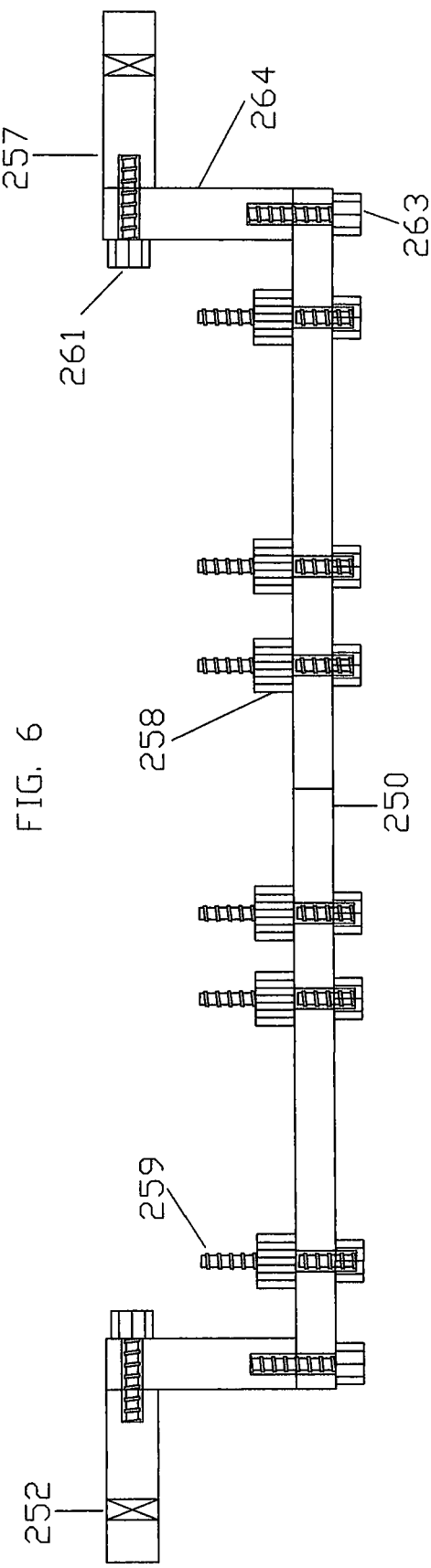
FIG. 6 is a front view of the primary vehicle support system.

With reference to FIG. 6, there is shown in front view a primary support assembly 250 of the inventive electric vehicle. At left and right thereof are shown screws 261 as well as their respective upper adjustable outer support surfaces 257. Said supports are mounted on top of body support member 264 inside the front (under hood) compartments. As may be noted, further provided are a plurality of rubber mounts 258 upon which each of the bolts 259 are threaded into primary support assembly 250. Further, at the left and right side of assembly 250 may be seen screws and nuts 263 which secure said member 264 screws and nuts 270 of body support systems 264.

In practice, the location of the various rubber mounts 258 are such that they are situated upon primary support assembly 250 but beneath fuel engine 106 and as well as beneath all front generators and the above complete power train system including the EDM 112, transmission 186 and drive axles 142 as above discussed.

Figure 7:
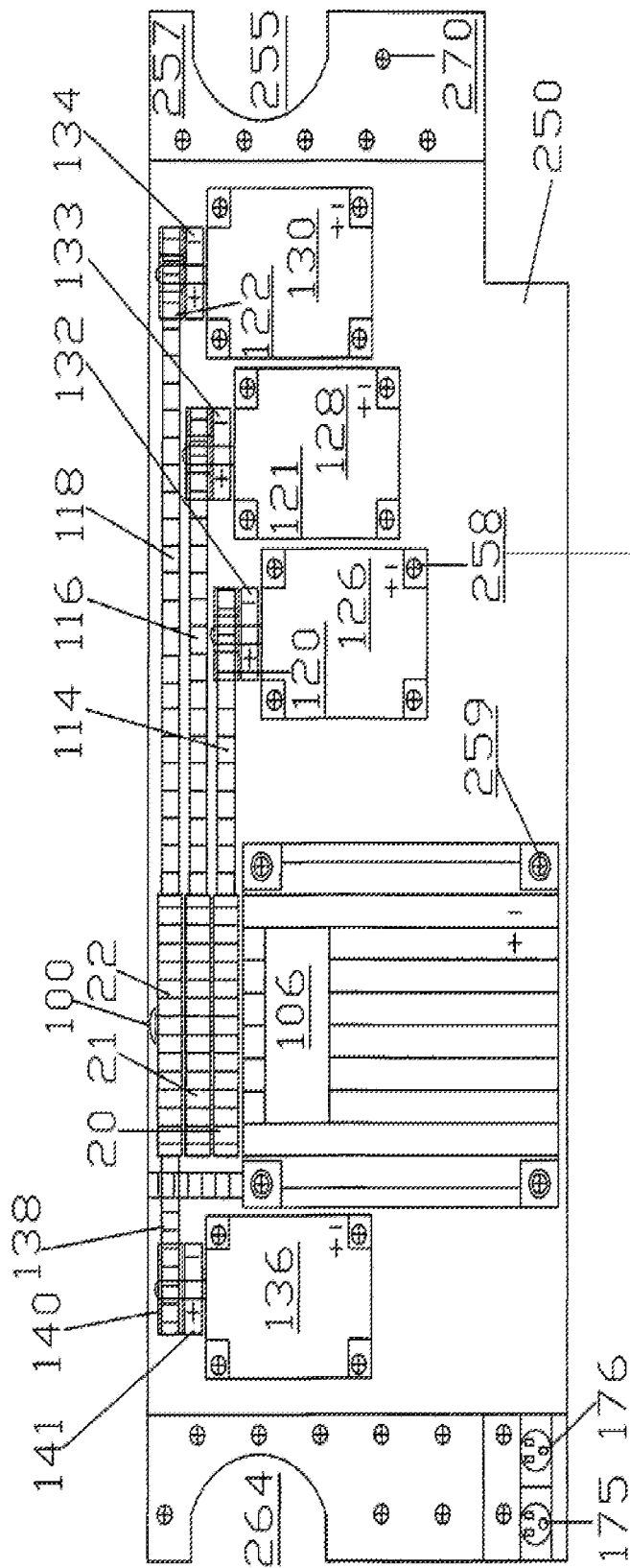
FIG. 7 is a bottom schematic view of the support system assembly of FIG. 6, additionally showing the location of material components of the electrical vehicle located under the front hood thereof.

With respect to FIG. 7, there is shown a bottom view of the support system of FIG. 6. Therein, at the left thereof may see backup fuel engine 106 and, AC generator 136 and its associated 120V and 240V outlets 175/176. See FIG. 1E. To the right of the fuel engine are shown first front lower DC generator 126, second front lower DC generator 128, and third front upper DC generator 130. The empty mounting space to the generator 130 right of upper DC indicates that an additional DC generator can be installed should, in certain applications, for example, in larger vehicles, such be required. It is noted that by simply increasing the horsepower of the fuel engine and increasing the size of fuel tank 110. If needed, one may enhance the number and size of the front DC generators of the inventive vehicle, thereby enabling continuously charging of the battery packs and thereby to supply unlimited AC/DC electric energy to the outside and to the vehicle's electric needs regardless of vehicle size.

Figure 8:
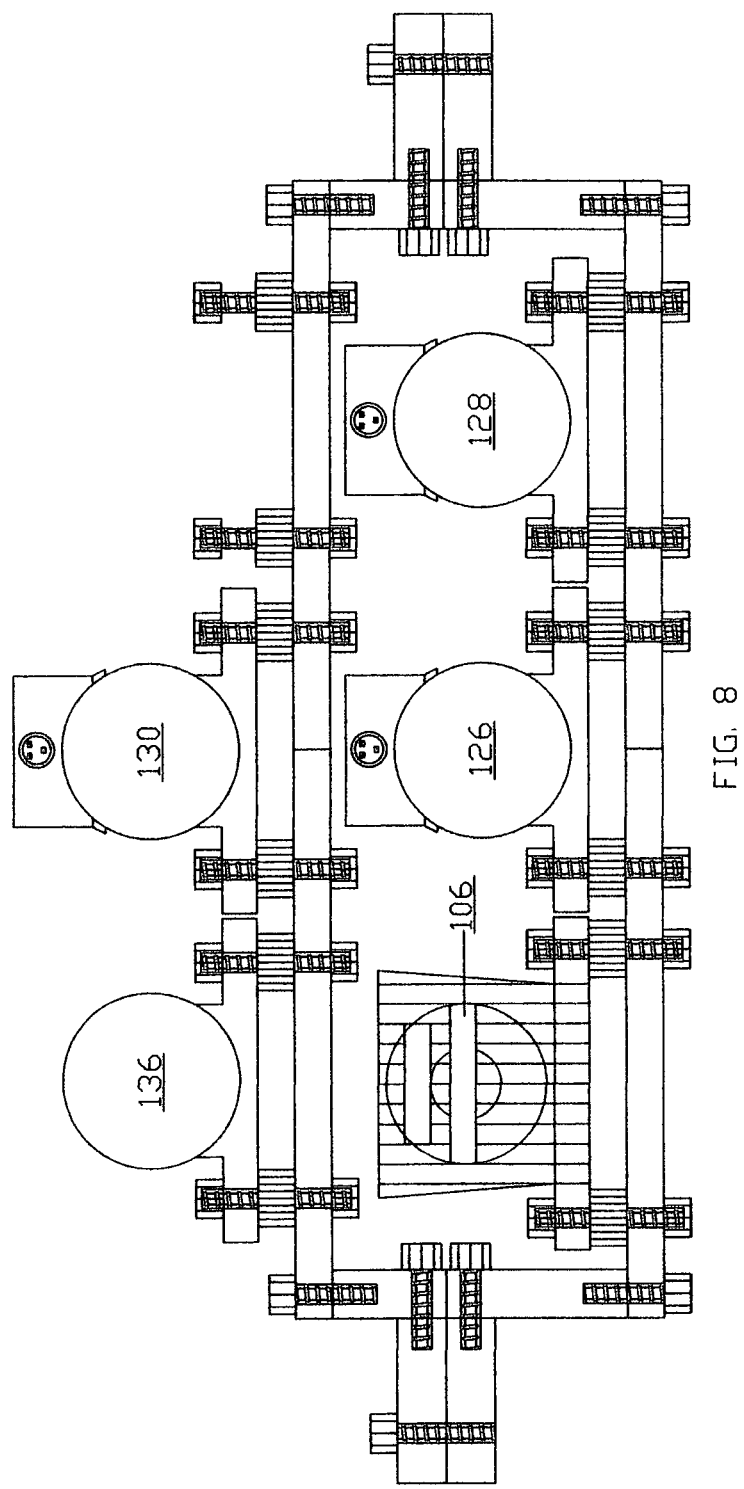
FIG. 8 is a top schematic view of a secondary support system assembly related to that of FIG. 6 showing the location of material components of the electrical vehicle positioned under the front hood thereof.

FIG. 8 is an example of the manner in which components shown in the front end of the vehicle in FIG. 1 may be mounted upon the primary support assembly 250 and its outer surfaces 257. Also shown are bolts 270 as well as curved cut-out areas 255 upon surfaces 257/264.

Figure 9:
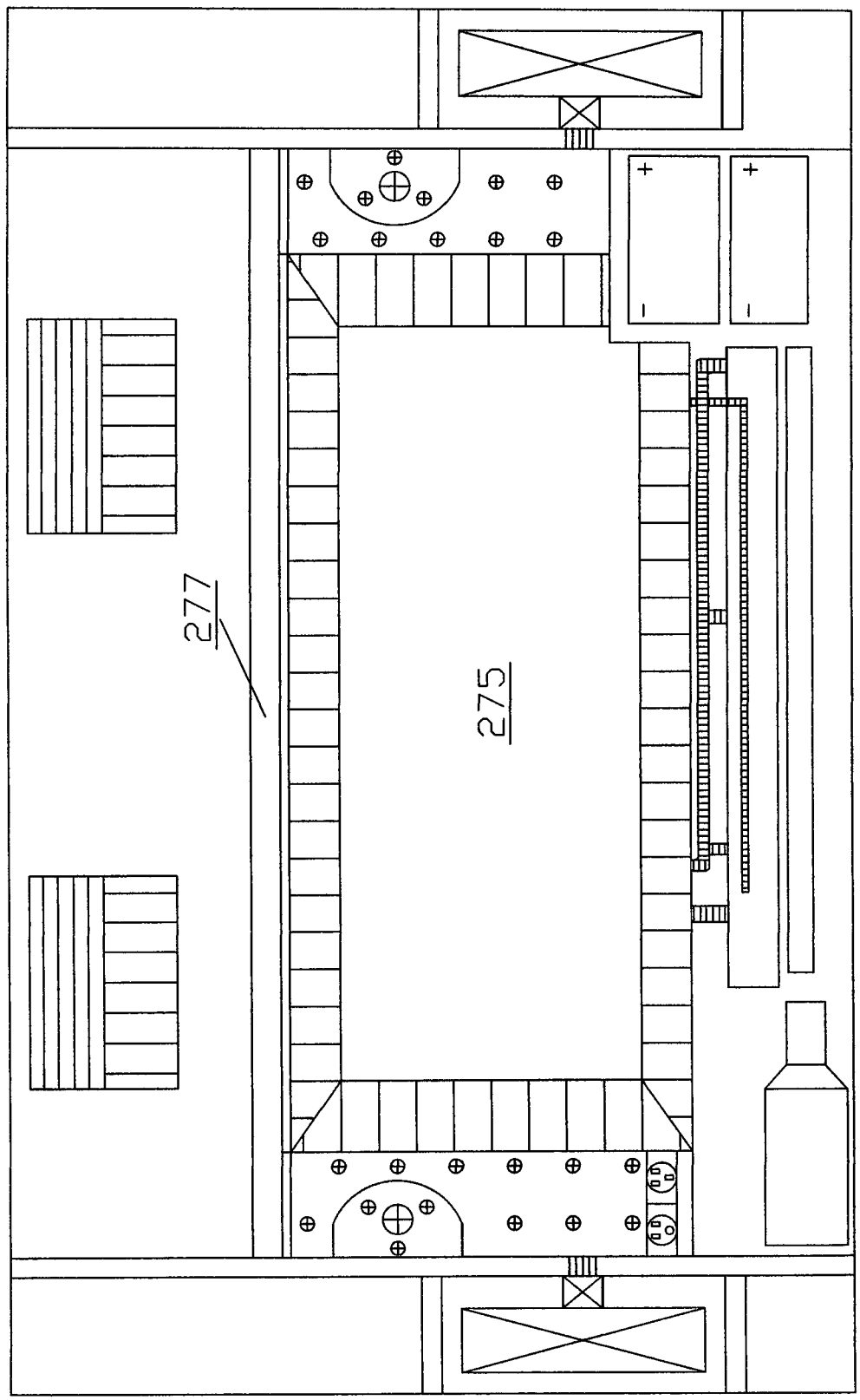
FIG. 9 is a top view of the assemblies shown in FIG. 8 illustrating the use of a protective high density plastic cover to provide protection to the operative front end components of the system shown in FIGS. 1 and 8.
Figure 10:
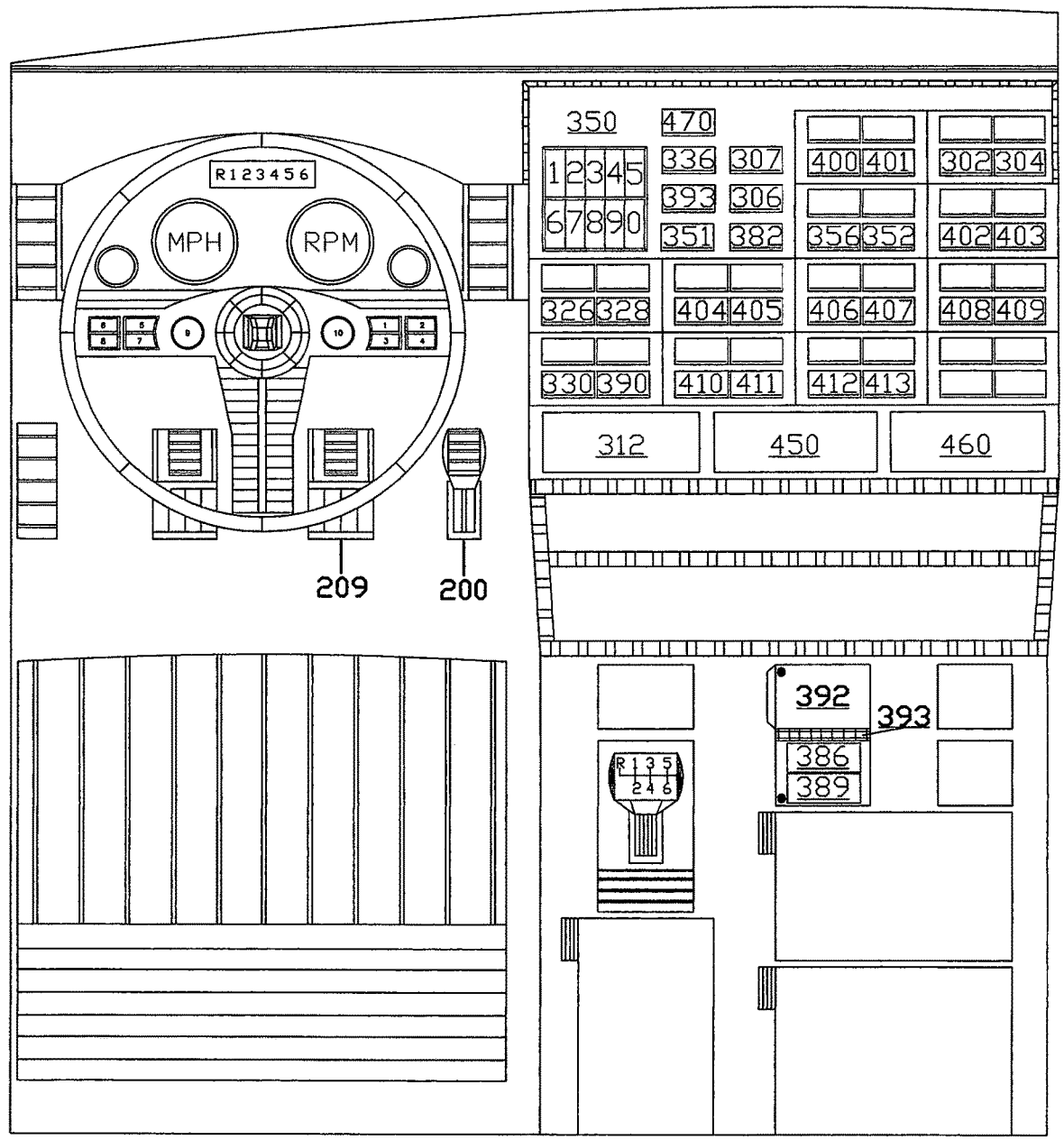
FIG. 10 is a schematic view of a 12+ volts "A/C-D/C Energy Recharging Control System" dashboard which is advantageously used with the present invention.

In FIG. 9 is shown a top view of fire resistant cover 275 which, with firewall 277, protects all components thereunder shown in FIGS. 1 and 8. Also shown in FIGS. 1 and 9 are the air filter 279 and fuel pump 109, an air conditioning condenser 194, automatic transmission cooling lines 196 and a radiator and heating system 198 and muffler 191, The functions of the electric vehicle are listed below:

When driver enters the e-vehicle, driver pushes a button to activate the touch screen control system 300 FIG. 10. Driver then activate the pin number system 350 FIG. 10; enters the programmed pin number, push enter and then the electric driver motor 112 is activated. The driver then shift from park to drive, release the brake pedal 209 FIG. 10 step on the accelerator pedal 200 FIG. 10 and all electric energy is supplied from the battery pack's 102/104 FIG. 1E to the electric driver motor 112 FIG. 1, FIG. 1E.

When driver reach the desired speed limit and the traffic light changes to red then the first thing the driver does release the electronic accelerator pedal 201 FIG. 2. and FIG. 2 A.

Then a special brake light switch 202 FIG. 2A that works in a reverse action then a normal brake light switch of the electronic accelerator pedal unit 200 FIG. 2A activates the rpm sensor 205 of the cruising DC generator or DC alternator 156 FIG. 2A and the rpm sensor 205 activate the timing gear electric clutch 164 and the timing gear electric clutch 164 activates the cruising DC generator or DC alternator 156, to start recharging the battery pack's 102 and 104 FIG. 1E. and FIG. 2.

All this recharging is free energy.

When driver comes closer to the red traffic light then the driver steps on the brake pedal 301 FIG. 2A, the secondary special brake light switch 302 activates the rpm sensor 306 of the driver side front braking DC generator or braking DC alternator 300, and the rpm censor 306 activates the timing gear electric clutch 304 along with breaking timing gear pulley 305, and breaking timing gear belt 169, shown in FIG. 2A of the braking DC generator or DC alternator 300 FIG. 2A, at that moment the braking DC generator or braking DC alternator 300 starts recharging the battery pack's 102 and 104.

At this moment the cruising DC generator or cruising DC alternator 156 and the braking DC generator or DC alternator 300 are recharging the battery pack's 102 and 104 at the same time.

All this recharging is free energy.

When the driver reaches the top of the high mountain and the driver starts driving down again the high mountain and as soon as the vehicle starts tilting in a certain angle then the downhill DC generator DC alternator 152 is electrically automatically activated from the 12 volt fuse box 111 to the rpm sensor 207 once a certain mph is achieved then the rpm sensor activates the electrically micro switch 174 and the electrically micro switch then activates the 12 volt timing gear electric clutch 162 at that second the timing gear electric clutch 162 activate the downhill DC generator or DC alternator 152 and the downhill DC generator or DC alternator 152 starts recharging the battery pack's 102 and 104.

All this recharging is free energy.

Once the vehicle starts driving downhill, the driver then removes his foot of the electronically accelerator pedal 201, a special brake light switch 202 activates the rpm sensor 205 and the sensor 205 activates the 12 volt a/c clutch 164 immediately thereafter the 12 volt electric clutch 164 activates the cruising DC generator or DC alternator 156 and the cruising DC generator or DC alternator 156 starts recharging the battery pack's 102 and 104.

All this recharging is free energy.

In the event the vehicle is moving too fast then the driver applies the brake pedal 301 and the secondary brake light switch 302 is electronically activated and at that moment the secondary brake light switch activates the rpm sensor 306.

The rpm sensor 306 on the braking DC generator or DC alternator 300 activate the 12 volt electric clutch 304 and the 12 volt electric clutch 304 activates the braking DC generator or DC alternator 300 and the DC braking generator or DC alternator 300 starts recharging the battery pack's 102 and 104.

All this recharging is free energy.

When the downhill, cruising and the braking DC alternators 152, 156 and 300, have been activated.

"All This Is Free Electric Energy Supplied To The Battery Pack's 102 and 104.

When the driver releases the brake pedal 301 and steps back on the accelerator pedal 201 and when the vehicle is back on the bottom of the mountain's and the vehicle levels off to normal then all 3 DC generators or DC alternators 152, 156 and 300 are totally disengage from recharging the battery packs and all internal moving parts are disengage from rotating, thus saves energy, wear and tear on all 3 DC generators or DC alternators.

When the electric driver motor 112 is moving the vehicle forward/backwards and when the electric clutches on all 3 DC generator or DC alternators 152, 156 and 300 are disengaged, than all internal parts are not rotating including the complete clutch system except for the pulley, belt and the bearing. Also the disconnected electric energy from the 12 volt battery that electrically powers the complete clutch system saves energy. The electric driver motor 112 saves electric energy from the main battery pack's 102/104. Thus the electric driver motor has to work less harder.

On a regular fuel engine vehicle, once the engine is running so is the 12 volts alternator, pulley and all internal parts until the fuel engine is turned off again. In this case the fuel engine has to work harder at all the time to move all turning parts of the alternator.

That creates more wasted energy. If the regular alternators in the fuel engine vehicles would have my clutch system than the fuel engine would save more fuel/energy.

When the driver drives the vehicle in reverse and at a certain speed then the driver releases the accelerator pedal 201 FIG. 2A and a few seconds later steps on the brake pedal 301 FIG. 2A the cruising DC generator or DC alternator 156 FIG. 2A and the braking DC generator or DC alternator 300 FIG. 2A are activated to recharge the battery pack's 102/104 FIG. 1E.

The cruising DC generator or DC alternator 156 and the braking DC generator or DC alternator 300 are designed to recharge the battery pack's in clockwise and counter clock wise rotation's.

The Back Up Recharging System

Back up recharging systems fuel engine would be, if available and or a totally new designed for clean fuel, like natural gas and or whatever is the best as of today or in the future. Thus saves on energy, cleaner environment, safer, less costly.

My electric vehicle power train system does not depend on the complete electric battery pack's system and or the fuel engine, or the type of fuel. Whatever is available as of today and whenever something better will be invented and made it can be installed with my existing systems. My system compare to other vehicle systems, saves many types of energy, humans, fuel, battery packs, electric, money savings, my system creates many times free energy to the battery pack's when the vehicle is moving, sometimes it creates more energy into the battery pack's than the electric driver motor uses. All this is free energy.

When driver drives a long distance, or stuck in heavy traffic for a long period of time and in the event the battery pack's 102/104 should deplete about 30% plus whatever the manufacturer adjust it to but no more than 50% from 100% full capacity, then the battery pack's sensor (not shown) send a signal to the electronic computer (not shown) that the battery pack's 102/104 have been depleted 50% from 100% full capacity then the electronic computer send a signal to the 12 volts electric starter/alternator 10 FIG. 1A. Immediately the 12 volt electric starter/alternator 10 activates the 12 volts timing gear electric clutch 16 FIG. 1A, timing gear electric clutch 16 then activates the fuel engine 106 FIG. 1A. At this time all timing gear pulleys 34/35/36 and 120/121/122 and all belts 114/116/118 are turning and connected to the 12 volts timing gear electric clutches 132/133/134 FIG. 1E. Now at the next few seconds the electronic computer activates the 120/240 volts DC generator or DC alternator 126 and the 120/240 volts DC generator or DC alternator 126 starts to supply direct DC electric energy to the 120/240 volts DC electric driver motor 112 at FIG. 1 E. At the next second the battery pack's 102/104 are disengaged from the electric driver motor 112.

More or less 30, 40, 50%. It is up to the manufacturer and depending on vehicle type.

Now at this time the electric driver motor 112 is driven from the electric energy of the 120/240 volts DC generator or DC alternator 126 and the 120/240 volts DC electric driver motor moves the vehicle forward/reverse.

Again the next few seconds the electric computer activates the 12 volts electric clutch 133 on the 120/240 volts DC generator or DC alternator 128 and then the 120/240 volts DC generator or DC alternator 128 starts supplying direct DC electric energy to the battery pack's 102/104.

Again the next few seconds the computer activates the 12 volts timing gear electric clutch 133 and then timing gear electric clutch 134 on the 120/240 volts DC generator or DC alternator 128 and then the 120/240 volts DC generator or DC alternator 130 starts supplying direct DC electric energy to the battery pack's 102/104. At this time both DC generator or DC alternator 128 and DC generator or DC alternator 130 are supplying direct DC electric energy to the battery packs until recharged to 100% from the adjusted level of up to 30% as mentioned above. At this time both DC generator or DC alternator 128 and DC generator or DC alternator 130 are supplying direct DC electric energy to the battery packs until recharged to 100% from the adjusted level of 30, 40 or 50% as mention above.

On both DC generators or DC alternators 128 and 130 the voltage and amps can be increased to any amount of DC electric energy to be able to recharge the battery pack's as fast as possible and the fuel engine is operating in a very low rpm mode, depending on the type and hp. does saves fuel, wear and tear when the d/c alternators 128/130 have been activated and running to recharge the battery pack's 102/104 including the DC generator or DC alternator 126.

In the event the belt 114 for the DC generator or DC alternator 126 should brake and or fall off thus the DC generator or DC alternator 126 stop supplying electric energy to the electric driver motor 112 at that moment the battery pack's 102/104 are automatically reconnected to the electric driver motor 112 and at that time the vehicle drives on normal battery power.

But the DC generator or DC alternators 128 and 130 are still supplying electric energy to the battery pack's 102/104 until driver drives to his destination and get the broken belt 114 replaced.

At this time the battery packs should be in a high % recharge.

Manual Functions of the Back Up Recharging System.

Driver at any time has the options to activate or deactivate the back up recharging system. When driver drives the electric vehicle and the battery pack's 102/104 are about 10-15% used up, the driver can activate the fuel engine 106 by entering a pin number from the pin number system 350 of touch screen system 300.

The driver enters the pin number, and the pin number system 350 sends a signal to the electric computer and the electric computer activates the 12 volts starter/alternator 10 and the 12 volts starter/alternator 10 activates the 12 volts electric clutch 16 FIG. 1A and the fuel engine 106 is activated. The driver then touch a designated number on the touch screen 350 for the 120/240 volts DC generator or DC alternator 128. The next few seconds the electric computer activates the 12 volts electric clutch 133 on the 120/240 volts DC generator or DC alternator 128 and then the 120 volts DC generator or DC alternator 128 starts supplying direct DC electric energy to the battery pack's 102/104.

The driver has the option to activate the 120/240 volts DC generator or DC alternator 130, again by touch the designated number on the touch screen 350 for the 120/240 volts DC generator or DC alternator 130.

It functions the same way as the 120/240 DC generator or DC alternator 128.

Once the battery pack's 102/104 are recharged again while driving then the 120/240 volts DC generator or DC alternators 128/130 are first disengaged from recharging the battery packs 102/104 about a second later the 120/240 volts D/C generator or D/C alternator 126 is disconnected from supplying electric energy to the electric driver motor 112 and then the battery packs are reconnected to the electric driver motor 112. Then the clean fuel engine 106 is turned off, thus the battery pack's 102/104 are always in a high recharged condition. This allows the battery pack's 102/104 to be in the best function conditions to supply at all times the electric energy when it is needed. This allows the battery pack's 102/104 to be in the best function conditions to supply at all times the electric energy when it is needed.

Electric Vehicle Mountain Driving

The driver knows the distance going up the mountains takes more energy for the electric driver motor 112 then the 30% from the battery pack's 102/104.

When vehicle reach the bottom of the mountain the driver has the option to activate the backup recharging system. The driver enters the pin number on pin number system 350 and the electric computer activates the 12 volts starter/alternator 10 FIG. 1A then the fuel engine 106 is activated true the 12 volts starter/alternator 10. Driver then on the touch screen 300 touches the number for the 120/240 volts DC generator or DC alternator 128 and again touches another number for the 120/240 volts DC generator or DC alternator 130. FIG. 1E. At this time both 120/240 volts DC generator or DC alternators 128/130 are continuously recharging the battery pack's 102/104 while driving up the long distance mountains. By the time the driver reaches the top of the mountain's the battery pack's 102/104 are in a very high recharge state. Does, the battery pack's 102/104 supply the best electric performance for the electric driver motor 112 FIG. 1/1E.

Electric Turbo Charge

The driver has the option at any time when driving the e-vehicle to activate the electric turbo charger.

The driver enters the pin number on the pin number system 350 the pin number system 350 sends a signal to the electronic computer and the electronic computer activates the electric starter/alternator and the electric starter/alternator 10 FIG. 1A activates the fuel engine 106, FIG. 1 and FIG. 1E. The driver then touch a designated number on the touch screen system 300 FIG. 10 thus the touch screen system 300 send a signal to the electronic computer and the electronic computer activates the 12 volts electric clutch 132 on the 120/240 volts D/C alternator 126 FIG. 1E and the 120/240 volts DC generator or DC alternator 126 send electric energy directly to the 120/240 volts DC electric driver motor 112 does the electric driver motor 112 propel the e-vehicle faster. When the driver steps on the brake pedal 301 FIG. 1 and FIG. 2A then the 120/240 volts DC generator or DC alternator is disconnected and stop supplying electric energy directly to the electric driver motor 112. Also at the same time the braking DC generator or DC alternator 300 FIG. 2A is activated to recharge the battery pack's 102/104.

Starter/Alternator Functions

Starter/Alternator starts the clean fuel engine 106. Every time when the fuel engine 106 is running and the 12 volts battery 107 is in a lower voltage then the starter/alternator starts recharging the 12 volts battery 107 until the battery is fully recharged then the starter/alternator is disconnect from recharging the 12 volts battery 107 and or when the clean fuel engine 106 is turned off.

Electric Vehicle Parking and Delivery Vehicles

When parking the e-vehicle and all electrical function are turned off, the driver that the battery pack's 102/104 are about 10% used up, the driver enters the pin number on pin number system 350 FIG. 10 and the and the pin number system send a signal to the electronic computer and the electronic computer activates the 12 volts starter/alternator 10 FIG. 1A. The fuel engine 106 FIG. 1A is now running in idle. The driver has the options to activate the 120/240 volts DC generator or DC alternator's 128 and 130 by entering the designated number's on the touch screen system 300 FIG. 10 and the electronic computer activates the 120/240 volts DC alternator's 128 and 130. Once the 120/240 volts DC generator or DC alternators have been activated then both supply electric energy to the battery pack's 102/104. The driver then can walk away from the vehicle. Once the battery pack's 102/104 are recharged the about 10% to full capacity then the complete back up recharging system shuts off.

The driver has another option as mention above to activate the complete back up recharging system by Mobil Phone any place the vehicle is parked. Thus the battery packs 102/104 are always fully recharged and supply the best electric energy to the battery pack's 102/104.

For delivery vehicles the driver can do the same as above and make the delivery while the batteries are been recharged.

Electric Vehicle Supply Outside Electric Energy

The driver open the front hood, connect the special manufacturers supplied 120/240 electric cable to the 120/240 volts outlets 175/176 FIG. 7 and connect to an outside 120/240 special electric outlet on drivers home, office or just have the cable outside for the use of electrical tools, machinery, military or the like anywhere where it is needed.

The driver enters the pin number on the pin number system 350 FIG. 10 and the electric computer activates the fuel engine 106 FIG. 1 A true the starter/alternator 10 FIG. 1 A at a short time the electric computer activates the 12 volts electric clutch 141 FIG. 7 and the electric 12 volts electric clutch 141 activates the 120/240 volts a/c alternator and supply electric energy to 120/240 electric outlets 175/176 and to the special manufacturers electric 120/240 cable.

Cold Weather Driving

Driver activates the pin number system 350 and then touches a designated touch screen number on the touch screen 300 for the heater. A signal is send to the electrical computer and the electrical computer activates the water cool fuel engine 106. The water cooling clean fuel engine 106 will be running only in a low idle, about 600/650 rpm thus supply heat for the inside of the e-vehicle. Also saves on clean fuel. In the event any of the 120/240 volts DC generator or DC alternators 126, 128 or 130 are activated and or deactivated, the water cooling clean fuel engine will always be running as long as the heater is on. The heat can be controlled manually on the dash, higher or lower. No need for an electrical heater that uses the electric energy from the battery pack's 102/104 and depletes the battery packs faster, also it will not supply as much heat as the present clean fuel engine system 106. Also the clean fuel engine 106 is less costly and more convenient to run than the outside electric recharging concept of the battery pack's 102/104.

On Certain Vehicles, depending on size and weight.

On the cruising DC generator or DC alternator 156, the voltage and amperage is designed for the highest voltage and highest amperage when recharging the battery pack's 102/104 without the driver noticing that the vehicle suddenly slowing down to fast. The driver will only noticed the recharging of the battery pack's by looking at the gauges. On the braking DC generator or DC alternator 300 the voltage and amperage is designed for the highest voltage and amperage when recharging the battery pack's 102/104. In this case the driver will notice when the braking DC generator or DC alternator 300 starts recharging the battery pack's 102/104 and does helping slowing down the vehicle. Does less force need to be applied to the brake pedal and less wear and tear on the braking system.

On the downhill DC generator or DC alternator 152 the voltage and amperage is designed for the highest voltage and amperage when recharging the battery pack's 102/104.

In this case the driver also will notice when the downhill DC generator or DC alternator 152 starts recharging the battery pack's 102/104 and does helping slowing down the vehicle. Does less use and force need to be applied to the brake pedal, also less wear and tear on the brake system.

When one or more of the three DC generators or DC alternators 152, 156 and 300 recharging the battery pack's all this is free energy and create longer free driving distance from the battery packs.

Energy Recharging Touchscreen Control System

A digital touchscreen dashboard for an electronically controlled power train recharging system can control every part of an electric vehicle's electrical recharging system, including movement, speed, distance, the EDM's use of energy and, in the "recharging cruising system," how much, fast and over what distance the electric energy has recharged back into the battery pack. The downhill recharging system operates similarly. Both recharging cruising and recharging downhill system can be activated, each alone or at about the same time. Also displayed the fuel engine starting, time of use, how much fuel is used during each segment of use, operation of DC generators, of recharging, how much electric energy is recharged back into the battery packs during each segment of use, fuel engine temperature, and temperatures of water cooling of the fuel engine for inside vehicle heater and air conditioning. Also provided are displays of air conditioner cooling system for the battery packs, 102/104 and DC generators 152/156.

AC generator 136 to supply power for external needs and the use of the fuel of the engine per hour. Also shown on the dashboard are icons for the 12+ volts SA, 12+ volts battery 107, EDM start/stop button, a keyless entry, start, valet parking, and a "pin number system," and an anti-theft system.

In operation, when the driver activates the touch screen system 300, he sees all information to the driver's phone and/or directly transfers it to one's e-mail, print documents for personal information and educates himself about how to achieve best energy efficiency when driving. The same system can apply too, for the auto mechanic at a dealer/repair shop. As well, the same information can be sent directly from the touchscreen, phone and/or computer to the vehicle manufacturer. As such, the manufacturer can inform the driver of any defects and/or possible recalls and advise the driver to take the vehicle to a dealer for service and or repair.

Infra-red/night vision cameras may be installed having noise amplification and recording system, under the hood to monitor all functions and enhance the normal noise of the components when in use. At the rear, two additional similar cameras may be installed inside of the two DC generators 152/156 and battery compartment to monitor the functions of all running components including the battery packs. All cameras information is transferred to the touchscreen 300, and the driver may turn that system on or off at any time. The driver can activate the cameras and can send all information's to the driver's telephone and/or computer. He can then see how all systems function and can see the same on the phone and/or computer at any location. The driver can also see the same driving functions as above on the touchscreen while driving the vehicle, providing to the driver instant information about his driving habits and functions of the system components. Thus the driver can adjust his driving habits for maximum electric energy savings including, for the two rear DC generators, to supply maximum electric energy back to them and obtaining the most mileage from the battery packs while driving without the backup fuel engine 106 when the front DC generators have been activated.

The information from all cameras can be transmitted by satellite to a manufacturer at any time when and if the manufacturer wishes to see the functions of all components. The manufacturer then can learn more about how to improve the vehicle's performance and energy savings and provide recalls to reduce any danger to the driver or of a breakdown of the vehicle. A special CD, DVD or USB for the owner is supplied from the vehicle's manufacturer to insert into the owner's computer and watch the functions of all operating systems as mentioned above.

Touch Screen Control System

The present invention includes an electrical touch screen system. The touch screen system includes numerous informational icons, namely:

EDM icon 312
battery pack icon 302/304
DC recharging cruising generator icon 356
DC recharging downhill generator icon 352
backup fuel engine start icon 306
backup fuel engine starter/alternator icon 307
DC generator icon 326
DC generator icon 328
DC generator icon 330
air cooling compartment icon 390
AC generator icon 336
pin number system 350
pin number system start icon 351
backup fuel engine stop icon 382
valet parking icon 470
EDM start button 386
EDM stop button 389
EDM start/stop covers 392
EDM start/stop cover hinge 393
backup fuel engine running time icon 400
backup fuel engine fuel consumption icon 401
backup fuel engine radiator water temperature icon 402
backup fuel engine heater temperature supply inside vehicle icon 403
under the hood night vision camera icon 404
under the hood night vision camera icon 405
to see electrical function under the hood and to activate for an iPhone, or similar version, icon 406
to see electrical functions under the hood and to activate for computer e-mail address icon 407
to activate under the hood night vision camera's report and download to iPhone, or similar version, icon 408
to activate under the hood night vision camera's report and download to computer e-mail address 409
electrical functions at the rear, inside the battery packs, DC generator's compartment, to activate night vision cameras icon 410
a front night vision camera's icon 411 to activate and open the larger icon 312
a front night vision cameras icon 412 to activate and open the larger icon 450
a the rear night vision cameras icon 413 to activate and open the larger icon 460

One aspect of the invention relates to a vehicle's keyless system that does not need an electronic or regular key to open the door, to start or operate the vehicle. With existing vehicle keyless systems, the driver must have the electronic key with him at all times to be able to unlock the driver side door, to start and operate the vehicle. There are however problems with this type of vehicle electronic keyless system. For example: When driver parks the vehicle and, in the event the driver drops his keys in a parking lot, does not realize it and then goes shopping, someone may find the electronic key, or know where the vehicle is. That person then can take the keys, open the door, start the vehicle and drive away.

The present invention includes a true new vehicle keyless system that does not need a key to open the driver door, start, operate or drive the vehicle. At the inside on the dashboard, near the driver door is a voice activation device (not shown) that the driver can talk to and instruct the pin number system 350 on the dashboard 300 to activate the pin number. A light will show that the pin number is activated. Once the driver requests the pin number, then the driver door unlocks the door. When the driver is inside the vehicle, he then enters the same and or another pin number. Once the driver enters a first or second pin number of pin number system 350, the driver then pushes start icon 351 and an activation signal is send to EDM start button 386. The driver then lifts up start/stop icons protective cover 392. Thus the driver is able to start the EDM. When the EDM is running and the driver wishes to drive, he must close cover 392. The cover 392 can be made so that it open and close by electric functions. When start/stop buttons 386/389 are activated electrically from icon 351 the cover protects the start/stop buttons 386/389 from accidently spilling liquid upon them by a person, and/or if the windows, sunroof and/or if the convertible top is down and it is not protected from rain, dirt, playing with by children of the start/stop buttons or from turning off of the EDM 112 while driving. To deactivate EDM 112 one lifts up cover 392, pushes stop button 389 and closes cover 392 again. Cover 392 can by electric opened when driver touch icon 351 and pushes stop button 389. Cover 392 includes a metal hinge 393. Cover 392 includes may be made of plastic, metal and with other decorative materials such as leather.

Touching of icon 411 opens the electric drive motor (EDM) icon 312 the driver can see the functions of the EDM upon a larger size 312 icon. The EDM icon will show the driver how much electric energy is used from the battery packs 102/104 in percentage and/or other terms. The touching of button 389 disconnects EDM icon 312.

Touching of icon 302 shows the driver exactly how much energy is left in the battery pack 102/104 in terms of percentage of maximum charge.

Touching of icon 356 relates to the recharging cruising generator 156 and shows the driver how much electric energy is recharging when driving flat and/or downhill into the battery packs 102/104 at how long such charging took, distance and percentage of battery maximum charge at the time.

Touching of icon 352 shows recharging downhill generator 152, recharging battery packs only when driving downhill. Touching of larger icon 350 enables entering of pin numbers, use of the icon for SA 10, SA 10 activation of the backup fuel engine 106 and turn off of the backup fuel engine by touching icon 382.

Touching icon 326 shows backup fuel engine 106 and front second and third DC generators 128/130. The icon shows how long engine 106 has been running.

Touching icon 401 shows backup fuel engine 106 and how much fuel it has used per gallon when running.

Touch large icon 350 to enter pin numbers. Touching icon SA 10 activates backup fuel engine 306. Touching icon 403 adjusts the inside vehicle heater system. If no heat is needed one touches icon 403 again to turn off heat and backup fuel engine turns off. Touching icon 403 again during the next 5 minutes it will show how much fuel has been used during the heating time.

Touching icon 330 under front hood dc generators shows how each functions and how much electric energy is recharged to the EDM from dc generator 126, DC generators 128/130 to the battery packs in percentages of charge and for what time period.

Automatic Recharging Monitoring System

By touching icon 412 it will open the large icon 450 and it will show under the front hood all moving components true two or more new night vision cameras (NVC). The NVC includes sound and record any abnormal functions of all components. The NVC's send all information's to the automatic recharging monitoring system (ARMS) icon 450 while the vehicle is moving and/or standing still.

By touching icon 406 the driver can download the ARMS 450 information's directly to one's phone.

By touching icon 407 the driver can download the ARMS 450 information's direct to e-mail address.

Touching icon 412 the driver can open the ARMS large icon 450 and see NVC's recorded functions under the hood of the vehicle's electrical recharging system while standing still and or driving. (ARMS)

By touching icon 409 the driver can open the ARMS large icon 460 and to see, at the rear battery packs 102/104 and DC generators 152/156, functions the same as large icon 450.

By touching icon 410 the driver can send all front under the hood ARMS 450/460 directly to the vehicle's manufacturer.

By touching icon 412 driver can send all rear compartments ARMS 450/460 directly to the vehicle's manufacturer.

The vehicle manufacturer may access ARMS 450/460 directly from their satellite system and can see all items' recharging systems under the hood, and in the rear compartment. Thereby, the manufacturer has complete knowledge of the system and can send information about any recalls or defects arising directly to the driver/owner of the vehicle while driving and or send to his/her iphone/e-mail address to inform the driver/owner to take the vehicle to a dealer for service and or replace of certain parts. It is also of value with recall problems and further problem's to the vehicle. This saves money, time, and other problems for the manufacturer.

Valet Parking System

When a driver/owner approaches a place where valet parking service is available, before the driver hands over the keys, the driver touches icon 350 enter pin number, and touches icon 470 to activate the valet parking system 470. The driver than hand over the keyless keys to a valet parking person (VPP) and the valet function locks the driver door with the keyless key. When vehicle is returned to the vehicle's driver/owner and the driver/owner starts driving, after a few minutes of driving, the valet parking system 470 (VPS) advises the driver/owner to enter pin numbers from pin number system 350 and then touch icon 470 to deactivate the valet parking system 470. In the event someone wants to steal the vehicle from the valet parking lot and/or the driver/owner does not reenter the pin number from pin number system 350, then the VPS 470 disconnect the electrical system to the EDM and/or another electrical component after about one mile of driving.

While there has been shown and described above the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

Having thus described my invention, I claim:

1. A method for powering an electrically driven vehicle having at least three wheels, comprising:
    (a) an electrical gauge determining the charging condition of at least one battery pack between DMF levels in a range of low of 30% and maximum of 100%;
    (b) the battery packs if depleted to at most 30% capacity, a computer activating an electric starter/alternator unit and activating at least one electric clutch, starting a clean fuel engine, at least one belt connecting to at least one belt tensioner, and at least one crankshaft rear pulley;
    (c) the computer employing a first timing gear electric clutch, activating a first front DC alternator having a rotor, and supplying electric energy to an electric driver motor, and disconnecting the battery packs from the electric driver motor;
    (d) thereafter, the computer activating the a second timing gear electric clutch of second front DC alternator, and third timing gear electric clutch of third front DC alternator;
    (e) the second front DC alternator, and third front DC alternator, charging the battery packs until fully recharged;
    (f) once the battery packs fully recharge, the first front DC alternator ceasing from supplying electric energy to the electric driver motor, thereafter the battery packs reconnecting to the electric driver motor, and running a second timing gear electric clutch pulley and a third timing gear electric clutch pulley;
    (g) the clean fuel engine, second timing gear belt, third timing gear belt, the second timing gear electric clutch pulley, and the third timing gear electric clutch pulley each continue operational function;

(h) thereafter the clean fuel engine turns off, second timing gear belt, third timing gear belt and, second timing gear electric clutch, third timing gear electric clutch, second timing gear electric clutch pulley and third timing gear electric clutch pulley turn off; the second front DC alternator and third front DC alternator cease from charging the battery packs; and (i) the electric driver motor propels a vehicle to a desired speed.

2. The method as recited in claim 1, further comprising:

(a) vehicle driving downhill and a downhill DC alternator reaching an appropriate angle, activating an electrical level orientation sensor;

(b) the electrical level orientation sensor supplying electrical energy to a RPM sensor;

(c) the RPM sensor activating a downhill timing gear electric clutch;

(d) the downhill timing gear electric clutch activating the downhill DC alternator and a rotor of said downhill DC alternator, the downhill timing gear electric clutch, downhill timing gear pulley driving the rotor of said downhill DC alternator, a downhill timing gear belt and downhill timing gear driveshaft pulley connected to a drive shaft;

(e) the downhill DC alternator recharging the battery packs; and (f) at level angle of the vehicle, the downhill DC alternator ceases recharging the battery packs.

3. The method as recited in claim 1, further comprising:

(a) the vehicle reaching a certain speed, and a cruising DC alternator reaching a certain RPM;

(b) an accelerator pedal activating an electric switch upon releasing said accelerator pedal;

(c) the electric switch activating an electric RPM sensor and a cruising timing gear electric clutch;

(d) the cruising timing gear electric clutch activating cruising DC alternator; a cruising timing gear pulley driving a rotor of said cruising DC alternator;

(e) a cruising timing gear belt and the cruising timing gear pulley connecting to a drive shaft;

(f) the cruising DC alternator recharging the battery pack; and (g) pressing accelerator pedal, cruising DC alternator ceasing recharging the battery packs upon acceleration.

4. The method as recited in claim 1, further comprising:

(a) the vehicle reaching a certain speed and a braking DC alternator reaching a certain RPM;

(b) pressing a brake pedal, an electric brake light switch activating an electric RPM sensor;

(c) the electric RPM sensor activating a breaking electric clutch;

(d) the breaking electric clutch activating the braking DC alternator;

(e) the braking DC alternator recharging the battery packs;

(f) the driver releasing the brake pedal; and (g) accelerating the vehicle, deactivating the braking DC alternator and stopping the breaking DC alternator from charging the battery packs.

5. The method as recited in claim 1, further comprising:

(a) activating the first front DC alternator in a matter of milliseconds by first timing gear electric clutch and the first timing gear belt connected to a crankshaft and the timing gear pulley of the clean fuel engine, and said first front DC generator producing electric energy when furnished to electric driving motor, and disconnecting the battery packs;

(b) activating the second front DC alternator, occurring at a maximum of one second after said first timing gear electric clutch activates, activating the second timing gear electric clutch, charging said battery packs; and (c) activating thereafter at a maximum of a second the third front DC alternator and the third timing gear electric clutch, further charging the said battery packs.

* * * * *